US012705899B2

(12) United States Patent
Samuel et al.

(10) Patent No.: US 12,705,899 B2
(45) Date of Patent: Aug. 11, 2026

(54) FIELD VISION CONTROL FRAMEWORK

(71) Applicant: Schlumberger Technology Corporation, Sugar Land, TX (US)

(72) Inventors: Prince Samuel, Sugar Land, TX (US); Debashis Gupta, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 186 days.

(21) Appl. No.: 18/723,592

(22) PCT Filed: Feb. 23, 2023

(86) PCT No.: PCT/US2023/063093
§ 371 (c)(1),
(2) Date: Jun. 24, 2024

(87) PCT Pub. No.: WO2023/164527
PCT Pub. Date: Aug. 31, 2023

(65) Prior Publication Data

US 2025/0054308 A1 Feb. 13, 2025

Related U.S. Application Data

(60) Provisional application No. 63/314,198, filed on Feb. 25, 2022.

(51) Int. Cl.
*G06V 20/52* (2022.01)
*G06V 20/62* (2022.01)

(52) U.S. Cl.
CPC .............. *G06V 20/52* (2022.01); *G06V 20/63* (2022.01); *G06V 2201/06* (2022.01)

(58) Field of Classification Search
CPC .... G06V 20/52; G06V 2201/06; G06V 20/63; G06V 2201/02; G06Q 10/04; G06Q 10/06; G06Q 50/06; G06N 20/00; E21B 41/00; E21B 2200/22
See application file for complete search history.

(56) References Cited

U.S. PATENT DOCUMENTS 10,460,170 B1 * 10/2019 Adler .................. G06V 20/176
11,176,369 B2 * 11/2021 Narahari .................. G06N 3/09
11,598,197 B2 * 3/2023 Rangarajan ............. E21B 43/12
(Continued)

FOREIGN PATENT DOCUMENTS

WO 2018093273 A1 5/2018

OTHER PUBLICATIONS

Search Report and Written Opinion of International Patent Application No. PCT/US2023/063093 dated Jun. 14, 2023, 7 pages.

*Primary Examiner* — Gregory M Desire
(74) *Attorney, Agent, or Firm* — Kyle R. Miiller

(57) ABSTRACT

A method can include receiving data for a field site by an edge framework gateway at the field site, where the data correspond to equipment operations at the field site and where the data include imagery data acquired by one or more cameras at the field site; performing image recognition on the imagery data to recognize gauges and to recognize content displayed on the gauges via execution of a machine learning model on the edge framework gateway; and issuing an instruction based at least in part on the recognized content displayed on the gauges.

20 Claims, 20 Drawing Sheets

(56) References Cited

U.S. PATENT DOCUMENTS

| | | | | |
|---|---|---|---|---|
| 11,663,837 | B2 * | 5/2023 | Aiello | G06V 20/62<br>382/176 |
| 11,711,135 | B1 * | 7/2023 | Gajjar | H04B 7/155<br>370/316 |
| 12,340,287 | B2 * | 6/2025 | Horowitz | G06N 20/00 |
| 2013/0175030 | A1 | 7/2013 | Ige | |
| 2019/0096205 | A1 | 3/2019 | Blech | |
| 2020/0106933 | A1 | 4/2020 | Lata | |
| 2020/0167931 | A1 | 5/2020 | Ge | |
| 2021/0357636 | A1 | 11/2021 | Bao | |

* cited by examiner

FIELD VISION CONTROL FRAMEWORK

CROSS-REFERENCE TO RELATED APPLICATION(S)

The subject disclosure is a National Stage Entry of International Application No. PCT/US2023/063093, filed Feb. 23, 2023, which claims priority from U.S. Provisional Appl. No. 63/314,198, filed on Feb. 25, 2022, herein incorporated by reference in its entirety.

BACKGROUND

A reservoir can be a subsurface formation that can be characterized at least in part by its porosity and fluid permeability. As an example, a reservoir may be part of a basin such as a sedimentary basin. A basin can be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.).

In oil and gas exploration, interpretation is a process that involves analysis of data to identify and locate various subsurface structures (e.g., horizons, faults, geobodies, etc.) in a geologic environment. Various types of structures (e.g., stratigraphic formations) may be indicative of hydrocarbon traps or flow channels, as may be associated with one or more reservoirs (e.g., fluid reservoirs). In the field of resource extraction, enhancements to interpretation can allow for construction of a more accurate model of a subsurface region, which, in turn, may improve characterization of the subsurface region for purposes of resource extraction. Characterization of one or more subsurface regions in a geologic environment can guide, for example, performance of one or more operations (e.g., field operations, etc.). As an example, a more accurate model of a subsurface region may make a drilling operation more accurate as to a borehole's trajectory where the borehole is to have a trajectory that penetrates a reservoir, etc., where fluid may be produced via the borehole (e.g., as a completed well, etc.). As an example, one or more workflows may be performed using one or more computational frameworks and/or one or more pieces of equipment that include features for one or more of analysis, acquisition, model building, control, etc., for exploration, interpretation, drilling, fracturing, production, etc.

SUMMARY

A method can include receiving data for a field site by an edge framework gateway at the field site, where the data correspond to equipment operations at the field site and where the data include imagery data acquired by one or more cameras at the field site; performing image recognition on the imagery data to recognize gauges and to recognize content displayed on the gauges via execution of a machine learning model on the edge framework gateway; and issuing an instruction based at least in part on the recognized content displayed on the gauges. A system can include a processor; memory accessible to the processor; processor-executable instructions stored in the memory and executable by the processor to instruct the system to: receive data for a field site by an edge framework gateway at the field site, where the data correspond to equipment operations at the field site and where the data include imagery data acquired by one or more cameras at the field site; perform image recognition on the imagery data to recognize gauges and to recognize content displayed on the gauges via execution of a machine learning model on the edge framework gateway; and issue an instruction based at least in part on the recognized content displayed on the gauges. One or more computer-readable media can include computer-executable instructions executable by a system to instruct the system to: receive data for a field site by an edge framework gateway at the field site, where the data correspond to equipment operations at the field site and where the data include imagery data acquired by one or more cameras at the field site; perform image recognition on the imagery data to recognize gauges and to recognize content displayed on the gauges via execution of a machine learning model on the edge framework gateway; and issue an instruction based at least in part on the recognized content displayed on the gauges. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

This description is not to be taken in a limiting sense, but rather is made merely for the purpose of describing the general principles of the implementations. The scope of the described implementations should be ascertained with reference to the issued claims.

Figure 1:
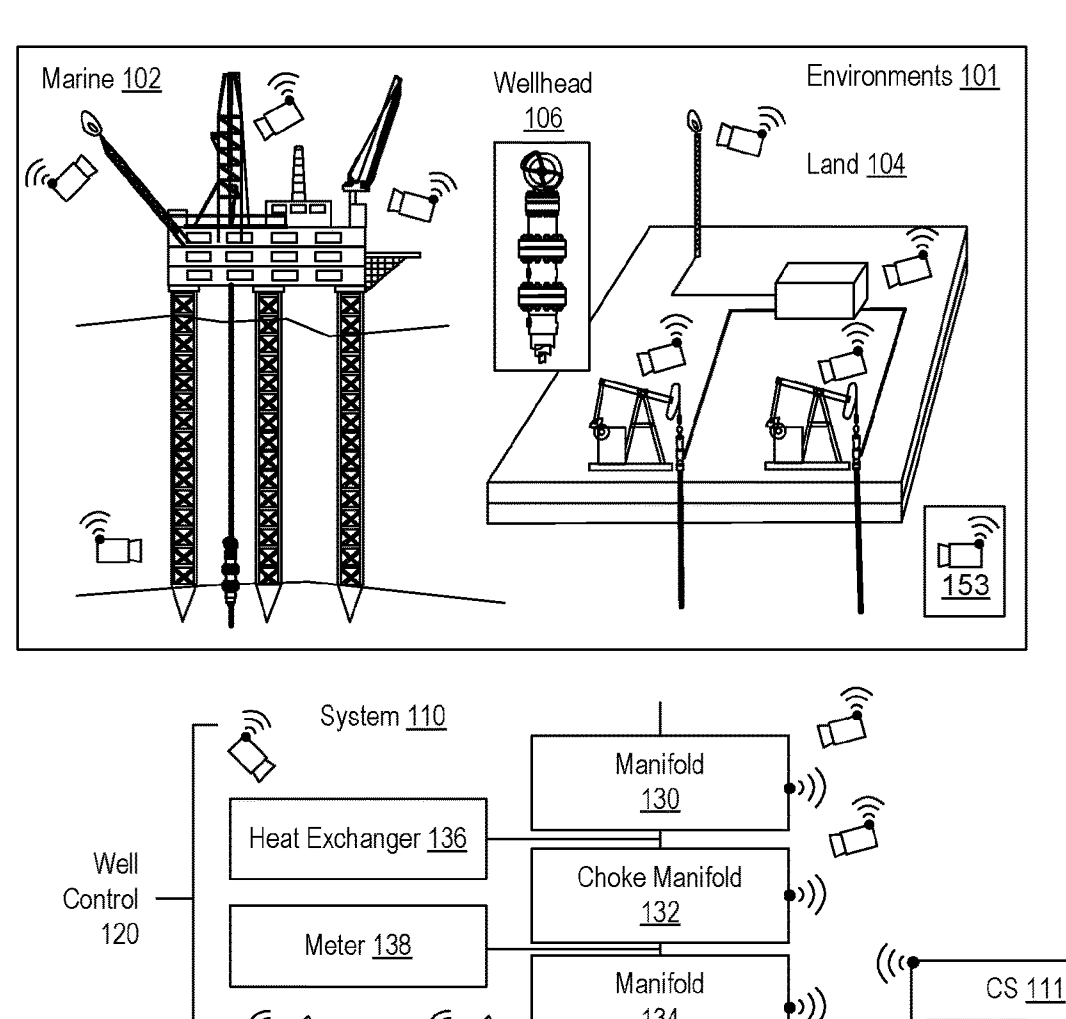
FIG. 1 illustrates an example system that includes components associated with one or more geologic environments.

FIG. 1 shows examples of environments 101, including a marine environment 102 and a land environment 104 where the marine environment 102 includes various equipment and where the land environment 104 includes various equipment. As shown, each of the environments 101 can include one or more wellheads 106 (e.g., wellhead equipment). A wellhead can be a surface termination of a wellbore that can include a system of spools, valves and assorted adapters that, for example, can provide for pressure control of a production well. A wellhead may be at a land surface, a subsea surface (e.g., an ocean bottom, etc.), etc. As an example, a wellhead can include one or more valves such as, for example, one or more choke valves. A choke valve may be located on or near a Christmas tree that is used to control the production of fluid from a well. For example, opening or closing a variable valve can influence the rate and pressure at which production fluids progress through a pipeline, process facilities, etc. As an example, an adjustable choke may be operatively coupled to an automated control system to enable one or more production parameters of one or more individual wells to be controlled. As an example, conduits from multiple wellheads may be joined at one or more manifolds such that fluid from multiple wells can flow in a common conduit.

As shown, in various environments, during one or more phases of development, production, etc., surface equipment can be present that is in fluid communication with a borehole, a completed well, etc. Such surface equipment (e.g., a surface system) can be in fluid communication for purposes of fluid injection and/or fluid production. For example, fluid injection can include injection of hydraulic fracturing fluid to generate fractures in a reservoir to increase production of hydrocarbon containing fluids from the reservoir, injection of treatment fluid such as a fluid for stimulation purposes, etc. As to fluid production, surface equipment can include various types of conduits, valves, meters, separators, etc. As an example, a surface system can include equipment that can be standalone in its operation and/or control. For example, a sub-system may be skid-mounted with a controller unit provided. In such an example, an overarching controller system may be operatively coupled to the controller unit. Where a surface system includes various sub-systems, each may include its own controller unit and/or interface that can be operatively coupled to an overarching controller system.

In various instances, however, an overarching controller system approach can make supervisory control decisions that may impact a sub-system where the sub-system may be left on its own as to how it handles or responds to a supervisory control decision. For example, consider an approach that aims to adequately control one or more set points (e.g., pressure, level, etc.) and that may take higher level actions as appropriate such as regulating flowrate to remain in a pressure/flowrate range of equipment.

In various examples, an autonomous surface system is described with respect to surface equipment associated with well testing, noting that, as mentioned, one or more other types of surface system may be similarly instrumented to be an autonomous surface system for one or more purposes.

Referring again to FIG. 1, at various times, a well may be tested using a process referred to as well testing. Well testing can include one or more of a variety of well testing operations. In various instances, fluid can flow from a well or wells to surface where the fluid is subjected to one or more well testing operations and generates scrap (e.g., waste fluid), which is to be handled appropriately, for example, according to circumstances, regulations, etc. For example, consider loading waste fluid into a tanker for transport to a facility that can dispose of the waste fluid. Another manner of handling waste fluid can be through combustion, which can be referred to as burning. As an example, burning can be part of a well testing process, whether burning is for handling waste fluid and/or for analyzing one or more aspects of how one or more waste fluids burn. As to the latter, burning may optionally provide data as to one or more characteristics of well fluid (e.g., a component thereof, etc.).

As an example, well testing can be performed during one or more phases such as during exploration and appraisal where production of hydrocarbons are tested using a temporary production facility that can provide for fluid sampling, flow rate analysis and pressure information generation, for example, to help characterize a reservoir. Various decisions can be based on well testing such as, for example, decisions as to production methods, facilities and possible well productivity improvements.

As to the example environments 101 of FIG. 1, well testing may be performed, for example, using equipment shown in the marine environment 102 and/or using equipment shown in the land environment 104. As an example, an environment may be under exploration, development, appraisal, etc., where such an environment includes at least one well where well fluid can be produced (e.g., via natural pressure, via fracturing, via artificial lift, via pumping, via flooding, etc.). In such an environment, various types of equipment may be on-site, which may be operatively coupled to well testing equipment.

As to artificial lift, consider utilization of one or more technologies such as, for example, gas lift, electric submersible pump (ESP) lift, etc. In a gas lift scenario, one or more valves may be controlled as to gas that can be injected into a reservoir fluid that can assist with producing the reservoir fluid at a wellhead. In such an example, one or more pocket valves, packer valves, surface valves, etc., may be utilized. As to ESP lift, consider a downhole ESP system that can pump reservoir fluid in a direction of a wellhead. As an example, a controller may be utilized for controlling one or more aspects of an artificial lift operation or operations at one or more wells.

FIG. 1 shows an example of a system 110 (e.g., a surface system) that can be operatively coupled to one or more conduits that can transport well fluid, for example, from one or more wellheads. As shown the system 110 can include a computational system 111 (CS), which can include one or more processors 112, memory 114 accessible to at least one of the one or more processors 112, instructions 116 that can be stored in the memory 114 and executable by at least one of the one or more processors 112, and one or more interfaces 118 (e.g., wired, wireless, etc.), which may be utilized, for example, for one or more types of communications with one or more of the different sub-systems and/or pieces of equipment of the surface system. In the example of FIG. 1, the system 110 is shown as including various communication symbols, which may be for transmission and/or reception of information (e.g., data, commands, etc.), for example, to and/or from the computational system 111. As an example, the computational system 111 can be a controller that can issue control instructions to one or more pieces of equipment in an environment such as, for example, the marine environment 102 and/or the land environment 104. As an example, the computational system 111 may be local, may be remote or may be distributed (e.g., in part local and in part remote, multiple local and/or remote locations, etc.).

Referring again to the wellhead 106, it can include various types of wellhead equipment such as, for example, casing and tubing heads, a production tree, a blowout preventer, etc. Fluid produced from a well can be routed through the wellhead 106 and into the system 110, which can be configured with various features for well testing operations.

In the example of FIG. 1, the system 110 is shown to include various segments, which may be categorized operationally. For example, consider a well control segment 120, a separation segment 122, a fluid management segment 124, and a burning segment 126. In such an example, one or more of the various segments may correspond to a sub-system or sub-systems. For example, consider the separation segment 122 corresponding to a separation sub-system.

As shown in the example of FIG. 1, the well control segment 120 is an assembly of various components such as a manifold 130, a choke manifold 132, a manifold 134, a heat exchanger 136 and a meter 138; the separation segment 122 includes a separator 142; the fluid management segment 124 is an assembly of various components such as pump manifolds and pumps 144, a tank manifold 146-1, a tank manifold 146-2, a tank 148-1 and a tank 148-2; and the burning segment 126 includes a burner 152 and one or more cameras 153. A manifold can be an arrangement of pipes and valves for the control of fluid circulation. A tank manifold enables control of fluid in and/or out of the tank while a pump manifold enables control of fluid in and/or out of the pumps.

As mentioned, in the example of FIG. 1, the system 110 includes various features for one or more aspects of well testing operations; noting that the system 110 may include lesser features, more features, alternative features, etc. In particular, each segment may include one or more sensors associated to particular equipment or locations in the segment. The sensors may sense information such as temperature, pressure, flow or state of equipment (e.g., for instance state of a valve). Other sensors may also be used as part of the system. For example, consider one or more of a gas specific gravity meter, a water-cut meter, a gas-to-oil ratio sensor, a carbon dioxide sensor, a hydrogen sulfide sensor, or a shrinkage measurement device. Various features may be upstream and/or downstream of a separator segment or a separator.

With respect to flow of fluid from a well or wells, such fluid may be received by the well control segment 120 and then routed via one or more conduits to the separation segment 122. In the example of FIG. 1, the heat exchanger 136 may be provided as a steam-heat exchanger and the meter 138 for measuring flow of fluid through the well control segment 120.

As mentioned, the well control segment 120 can convey fluid received from one or more wells to the separator 142. As an example, the separator 142 can be a horizontal separator or a vertical separator, and can be a two-phase separator (e.g., for separating gas and liquids) or a three-phase separator (e.g., for separating gas, oil, and water). A separator may include various features for facilitating separation of components of incoming fluid (e.g., diffusers, mist extractors, vanes, baffles, precipitators, etc.).

As an example, fluid can be single phase or multiphase fluid where "phase" can refer to an immiscible component (e.g., consider two or more of oil, water and gas for a multiphase fluid).

As an example, the separator 142 can be used to substantially separate multiphase fluid into its oil, gas, and water phases, as appropriate and as present, where each phase emerging from the separator 142 may be referred to as a separated fluid. Such separated fluids may be routed away from the separator 142 to the fluid management segment 124. In various instances, the separated fluids may not be entirely homogenous. For example, separated gas exiting the separator 142 can include some residual amount of water or oil and separated water exiting the separator 142 can include some amount of oil or entrained gas. Similarly, separated oil leaving the separator 142 can include some amount of water or entrained gas.

As shown in the example of FIG. 1, a system can include one or more manifolds, where depending on number of wells (e.g., 1, 2, 3, . . . , N), types of equipment, etc., a single manifold may suffice or there may be more than a single manifold. In the example of FIG. 1, the fluid management segment 124 can include flow control equipment, such as one or more manifolds and one or more pumps (generally represented by the block 144) for receiving fluids from the separator 142 and conveying the fluids to other destinations, optionally along with one or more additional manifolds 146-1 and 146-2, for example, for routing fluid to and from fluid tanks 148-1 and 148-2. As explained, the number of manifolds and tanks can be varied according to various factors. For instance, in one embodiment the fluid management segment 124 can include a single manifold and a single tank, while in other embodiments the fluid management segment 124 can include more than two manifolds and more than two tanks.

As to the manifolds and pumps 144, they can include a variety of manifolds and pumps, such as a gas manifold, an oil manifold, an oil transfer pump, a water manifold, and a water transfer pump. In at least some embodiments, the manifolds and pumps 144 can be used to route fluids received from the separator 142 to one or more of the fluid tanks 148-1 and 148-2 via one or more of the additional manifolds 146-1 and 146-2, and to route fluids between the tanks 148-1 and 148-2. As an example, the manifolds and pumps 144 can include features for routing fluids received from the separator 142 directly to the one or more burners 152 for burning gas and oil (e.g., bypassing the tanks 148-1 and 148-2) or for routing fluids from one or more of the tanks 148-1 and 148-2 to the one or more burners 152.

As noted above, components of the system 110 may vary between different applications. As an example, equipment within each functional group of the system 110 may also vary. For example, the heat exchanger 136 could be provided as part of the separation segment 122, rather than of the well control segment 120.

In certain embodiments, the system 110 can be a surface well testing system that can be monitored and controlled remotely. Remote monitoring may be effectuated with sensors installed on various components. In some instances, a monitoring system (e.g., sensors, communication systems, and human-machine interfaces) can enable monitoring of one or more of the segments 120, 122, 124 and 126. As shown in the example of FIG. 1, the one or more cameras 153 can be used to monitor one or more burning operations of the one or more burners 152, which may aim to facilitate control of such one or more burning operations at least in part through analysis of image data acquired by at least one of the one or more cameras 153. As an example, one or more cameras may be utilized for temperature monitoring. For example, consider an infrared camera that can utilize infrared wavelength emissions (e.g., consider approximately 1 μm to approximately 14 μm) to determine temperature where temperature may be utilized for process control, safety, etc.

Figure 2:
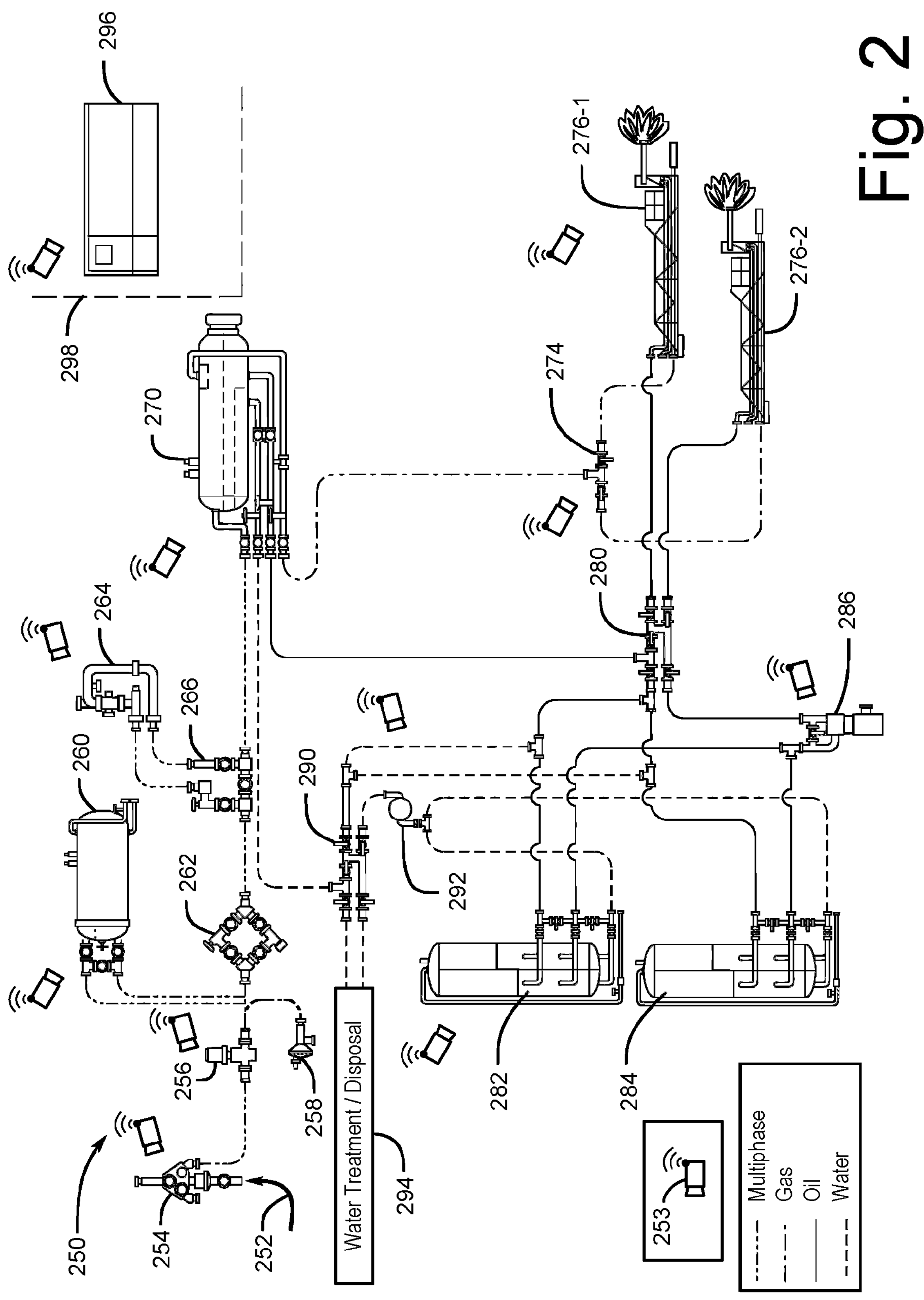
FIG. 2 illustrates an example of a system.

FIG. 2 shows an example of a system 250, which may be referred to as a surface well testing system. The system 250 can include various features of the system 110 of FIG. 1. For example, the system 250 can include one or more cameras 253.

In FIG. 2, a multiphase fluid (represented here by arrow 252) enters a flowhead 254 and is routed to a separator 270 through a surface safety valve 256, a steam-heat exchanger 260, a choke manifold 262, a flow meter 264, and an additional manifold 266. In the example of FIG. 2, the system 250 includes a chemical injection pump 258 for injecting chemicals into the multiphase fluid flowing toward the separator 270, as may be desired.

In the depicted embodiment of FIG. 2, the separator 270 is a three-phase separator that generally separates the multiphase fluid 252 into gas, oil, and water components. The separated gas is routed downstream from the separator 270 through a gas manifold 274 to either of the burners 276-1 and 276-2 for flaring gas and burning oil. The gas manifold 274 includes valves that can be actuated to control flow of gas from the gas manifold 274 to one or the other of the burners 276-1 and 276-2. Although shown next to one another in FIG. 2 for sake of clarity, the burners 276-1 and 276-2 may be positioned apart from one another, such as on opposite sides of a rig, etc.

As shown, the separated oil from the separator 270 can be routed downstream to an oil manifold 280. Valves of the oil manifold 280 can be operated to permit flow of the oil to either of the burners 276-1 and 276-2 or either of the tanks 282 and 284. The tanks 282 and 284 can be of a suitable form, but are depicted in FIG. 2 as vertical surge tanks each having two fluid compartments. Such an approach allows each of the tanks 282 and 284 to simultaneously hold different fluids, such as water in one compartment and oil in the other compartment. An oil transfer pump 286 may be operated to pump oil through the well testing system 250 downstream of the separator 270. The separated water from the separator 270 can be similarly routed to a water manifold 290. Like the oil manifold 280, the water manifold 290 includes valves that can be opened or closed to permit water to flow to either of the tanks 282 and 284 or to a water treatment and disposal apparatus 294. A water transfer pump 292 may be used to pump the water through the system.

A well test area in which the well testing system 250 (or other embodiments of a well testing system) is installed may be classified as a hazardous area. In some embodiments, the well test area is classified as a Zone 1 hazardous area according to International Electrotechnical Commission (IEC) standard 60079-10-1:2015.

In the example of FIG. 2, a cabin 296 at a wellsite may include various types of equipment to acquire data from the well testing system 250. These acquired data may be used to monitor and control the well testing system 250. In at least some instances, the cabin 296 can be set apart from the well test area having the well testing system 250 in a non-hazardous area. This is represented by the dashed line 298 in FIG. 2, which generally serves as a demarcation between the hazardous area having the well testing system 250 and the non-hazardous area of the cabin 296.

The equipment of a well testing system can be monitored during a well testing process to verify proper operation and facilitate control of the process. Such monitoring can include taking numerous measurements by appropriate sensors during a well test, examples of which can include choke manifold temperature and pressures (upstream and downstream), heat exchanger temperature and pressure, separator temperature and pressures (static and differential), oil flow rate and volume from the separator, water flow rate and volume from the separator, and fluid levels in tanks of a system.

As an example, a system can be configured for local and/or remote rendering of information, control, etc. For example, consider a mobile computing device such as a tablet computing device that can be operatively coupled to remote computing resources via a wired network, a wireless network, etc. In such an example, the remote computing resources may be or include a multicloud management platform (MCMP, e.g., an IBM MCMP, etc.; International Business Machines Corporation, Armonk, New York). In such an example, a mobile computing device can include hardware suitable to execute a browser application or another type of application suitable for rendering graphical user interfaces to a display, which may be a touchscreen display. For example, consider a browser application executing on a mobile computing device that a user can interact with a MCMP for one or more purposes. In such an approach, the mobile computing device may provide for interactions for one or more of equipment maintenance, equipment sensor data, equipment control (e.g., set points, etc.), etc. In such an approach, a user may assess equipment using a mobile computing device, which can provide the user flexibility as to the user's location, which may be, for example, remote from an equipment site. Using a mobile computing device, a user may "check" various types of equipment that are at a site on a daily basis or a less frequent basis and/or a more frequent basis.

Figure 3:
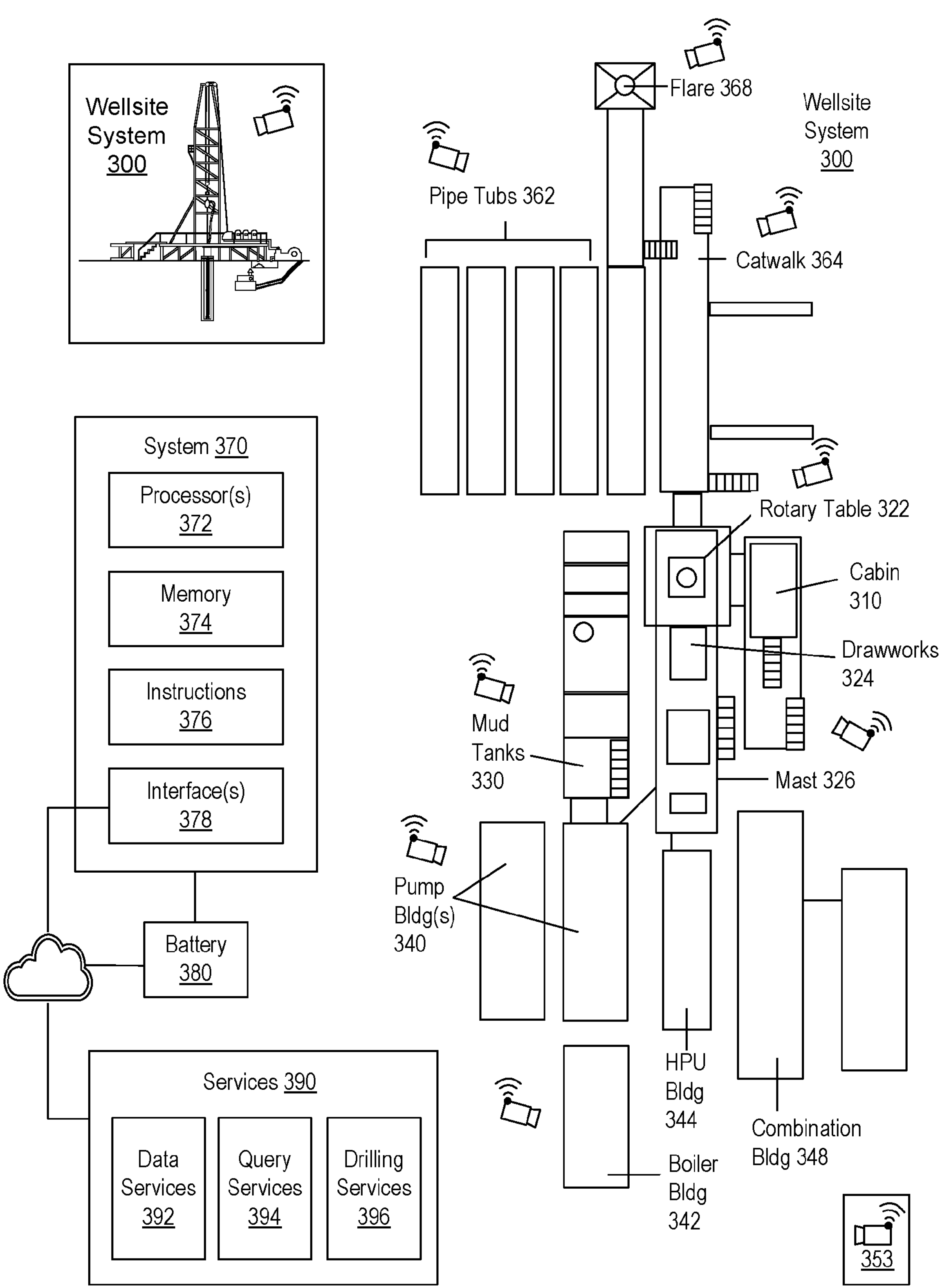
FIG. 3 illustrates an example of a system.

FIG. 3 shows an example of a wellsite system 300, specifically, FIG. 3 shows the wellsite system 300 in an approximate side view and an approximate plan view along with a block diagram of a system 370.

In the example of FIG. 3, the wellsite system 300 can include a cabin 310, a rotary table 322 (e.g., and/or top drive), drawworks 324, a mast 326 (e.g., optionally carrying a top drive, etc.), mud tanks 330 (e.g., with one or more pumps, one or more shakers, etc.), one or more pump buildings 340, a boiler building 342, an HPU building 344 (e.g., with a rig fuel tank, etc.), a combination building 348 (e.g., with one or more generators, etc.), pipe tubs 362, a catwalk 364, a flare 368, etc. Such equipment can include one or more associated functions and/or one or more associated operational risks, which may be risks as to time, resources, and/or humans.

As shown in the example of FIG. 3, the wellsite system 300 can include a system 370 that includes one or more processors 372, memory 374 operatively coupled to at least one of the one or more processors 372, instructions 376 that can be, for example, stored in the memory 374, and one or more interfaces 378. As an example, the system 370 can include one or more processor-readable media that include processor-executable instructions executable by at least one of the one or more processors 372 to cause the system 370 to control one or more aspects of the wellsite system 300. In such an example, the memory 374 can be or include the one or more processor-readable media where the processor-executable instructions can be or include instructions. As an example, a processor-readable medium can be a computer-readable storage medium that is not a signal and that is not a carrier wave.

FIG. 3 also shows a battery 380 that may be operatively coupled to the system 370, for example, to power the system 370. As an example, the battery 380 may be a back-up battery that operates when another power supply is unavailable for powering the system 370. As an example, the battery 380 may be operatively coupled to a network, which may be a cloud network. As an example, the battery 380 can include smart battery circuitry and may be operatively coupled to one or more pieces of equipment via a SMBus or other type of bus.

In the example of FIG. 3, services 390 are shown as being available, for example, via a cloud platform. Such services can include data services 392, query services 394 and drilling services 396.

As an example, a map of a wellsite may include a graphical representation of a wellsite such as that of FIG. 2, FIG. 3, etc. As an example, a map may be automatically generated or semi-automatically generated based on sensed information. For example, during set up or initial operation, cameras may capture images as to locations of equipment, buildings, etc. As an example, one or more of the drones may fly missions that can capture images, video, etc. that can be processed to generate a map, optionally a three-dimensional map of a wellsite. As an example, a combination of information from one or more mounted cameras and one or more drones may be combined to form a three-dimensional map or model of a wellsite.

As an example, a method can include generating an initial model of a wellsite, identifying portions of the model that are lacking as to information (e.g., spatial or other information) and instructing a camera or cameras and/or a drone or drones (e.g., to fly one or more missions) to acquire information that can more fully develop the model.

Figure 4:
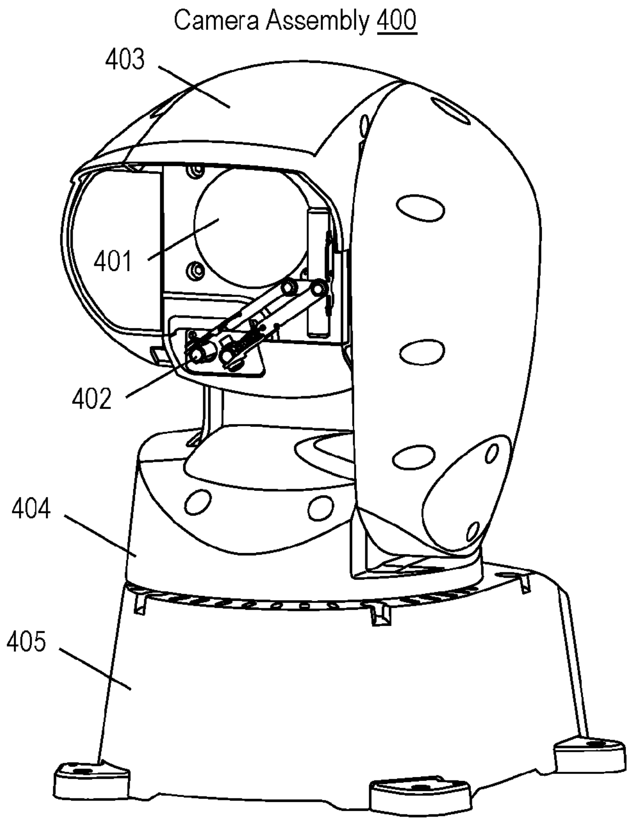
FIG. 4 illustrates an example of a camera assembly.
Figure 4:
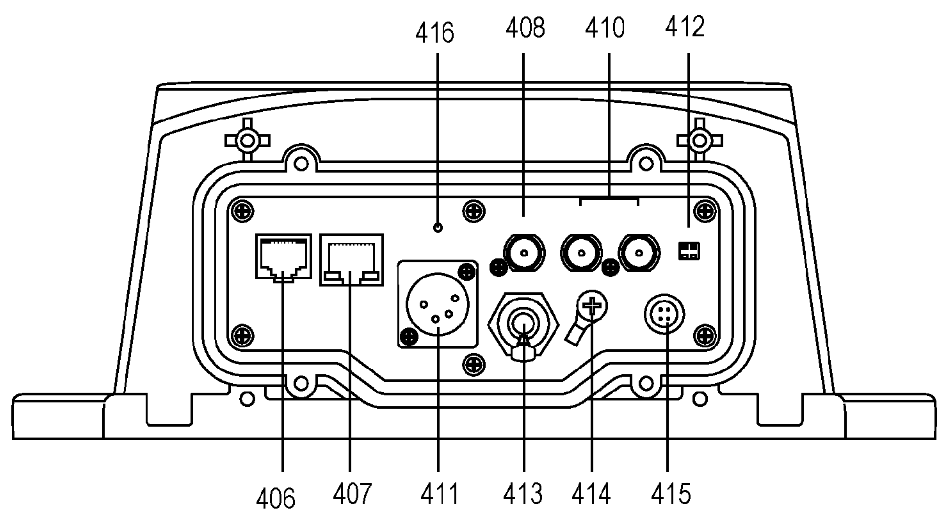

FIG. 4 shows an example of a camera assembly 400. In FIG. 4, the camera assembly 400 can be suitable for outdoor use. Such a camera assembly can include one or more features of a camera assembly such as the PANASONIC AW-HR140 series camera assemblies. The PANASONIC AW-HR140 series camera assemblies include an outdoor compatible full HD camera (e.g., 60 fps, etc.) with an integrated pan-tilt head that features the 1/2.86-type full HD 3MOS sensor and digital signal processor (DSP), an optical 20× zoom lens, 10× digital zoom to achieve images that have a horizontal resolution of 1000 lines, built-in image-shake correction and night mode functions, IP control and/or serial control, etc. As to the night mode, it provides for use of infrared rays for at least image capture under low-light conditions. The PANASONIC AW-HR140 series camera assemblies can be connected to a computer via an IP network and may be operable via a web browser application. As to various environmental features, consider a camera assembly that includes a defroster, vibration correction, a wiper or wipers, haze reduction, heater, washer, etc.

In the example of FIG. 4, the camera assembly 400 is shown as including a camera 401, a wiper 402, a pivotable and rotatable head assembly 403, a turntable 404 and a base 405. In the example of FIG. 4, the camera assembly 400 is shown as including various ports such as, for example, a RS-422 connector (e.g., RJ45) for serial communication 406, a LAN connector (e.g., RJ45) for IP control 407, which can utilize power over Ethernet (POE), a G/L in connector (e.g., external sync signal for various video formats, etc.) 408, a SDI out connector 410, a DC in connector 411, mode switches 412, an audio in connector 413, a ground connector 414, an EXT connector (e.g., for washer control, etc.) 415, a status lamp 416, etc.

Figure 5:
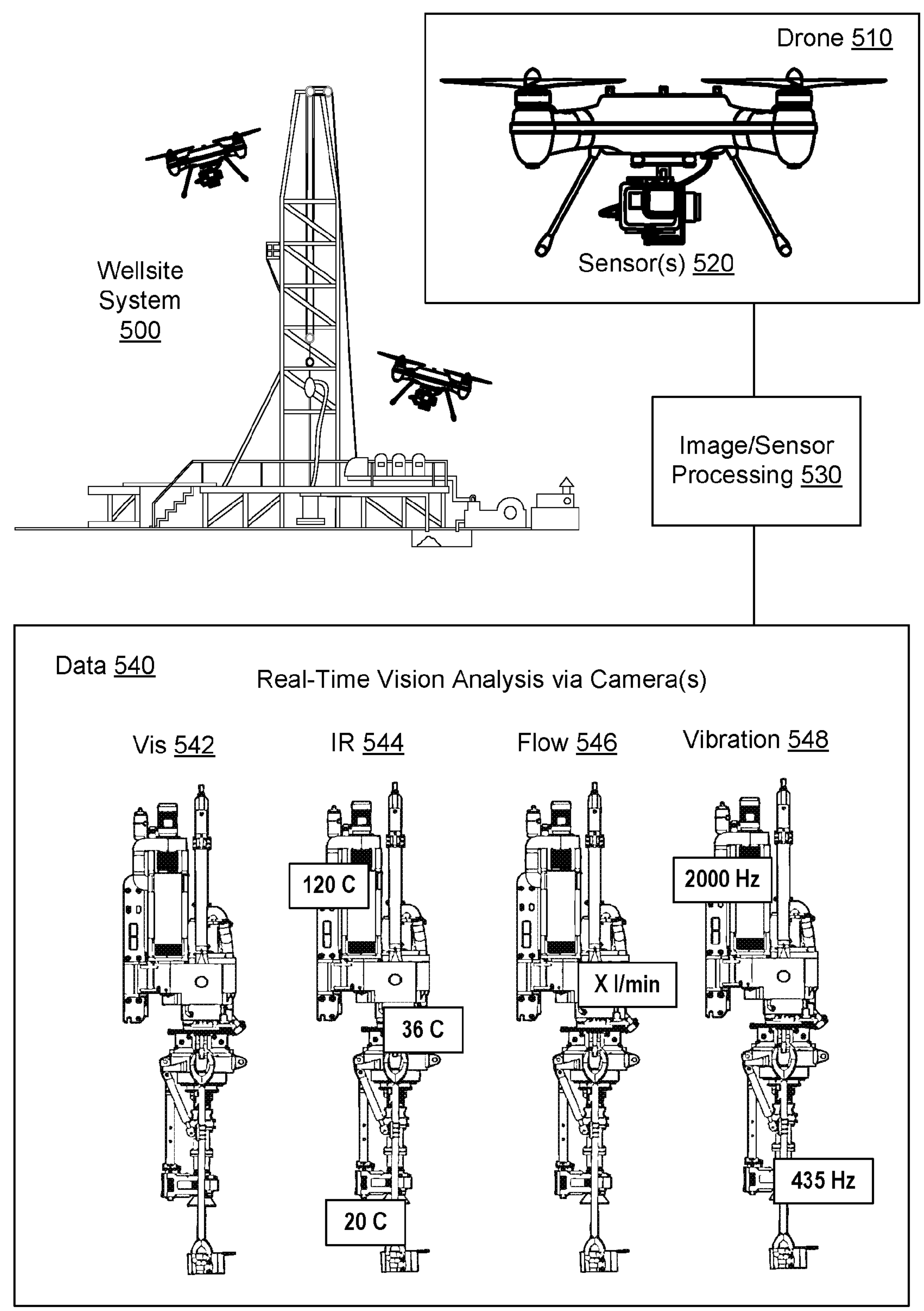
FIG. 5 illustrates an example of a system, an example of a drone and examples of data.

FIG. 5 shows an example of a wellsite system 500 that can include one or more cameras and/or one or more drones such as an example drone 510, which may carry and/or include one or more sensors (e.g., camera, etc.).

As an example, the wellsite system 500 can include an image and/or sensor processing module 530. For example, where a sensor captures images, the images may be subject to one or more machine vision algorithms to discern particular information. For example, consider a machine vision vibration analysis algorithm where information as to movements of a piece of equipment may be analyzed as to vibration. As an example, where a sensor includes IR detectors or other thermal detectors, information may be analyzed to determine one or more temperatures, rates of heat generation, heat dissipation, etc. As an example, where a sensor can detect movement of fluid (e.g., liquid, slurry, gas, etc.), sensed information may be analyzed to detect such movement (e.g., fluid velocity, fluid homogeneity, solids content, gas entrainment, etc.).

In the example of FIG. 5, data 540 are shown as to four images that may be real-time images as captured by one or more cameras. As an example, at a cabin or another location such images may be rendered to a display where the images are annotated with information acquired via the one or more sensors of the drone and/or other information, which may be a sensor or sensors operatively coupled to a piece of equipment.

In the example of FIG. 5, a top drive is illustrated as may be included in the wellsite system 500. The data 540 may be renderable, for example, as a visible image 542, an infrared (IR) image with temperatures 544, a flow image with flow rate 546, a vibration image with vibrations frequencies 548, etc. As an example, an operator (e.g., in a drill cabin or elsewhere) and/or a controller may fly a drone to inspect a piece of equipment where, in real-time, information may be acquired and optionally visualized, such information may be processed and utilized in decision making, operational control, etc.

As an example, a camera may capture images of one or more gauges, which may be analog and/or digital gauges. In such an example, a captured image may be analyzed to determine a numeric value or numerical values. For example, consider a dial gauge that includes a needle or pointer that rotates about a pivot point. In such an example, the amount of pivot with respect to one or more references (e.g., fiducials, etc.) may be utilized to convert a needle position or positions to one or more numeric values. As to a digital readout gauge, a captured image may be analyzed using image to character recognition (e.g., OCR, etc.) such that a numeric readout can be converted into a number suitable for communication in a digital form.

In the example of FIG. 5, the use of a drone can effectively extend the eyes of local and/or remote individuals. In such an example, information rendered to a display can include annotations as to one or more characteristics of a piece of equipment. In such an example, information underlying the annotations can optionally include information sensed via one or more cameras.

Figure 6:
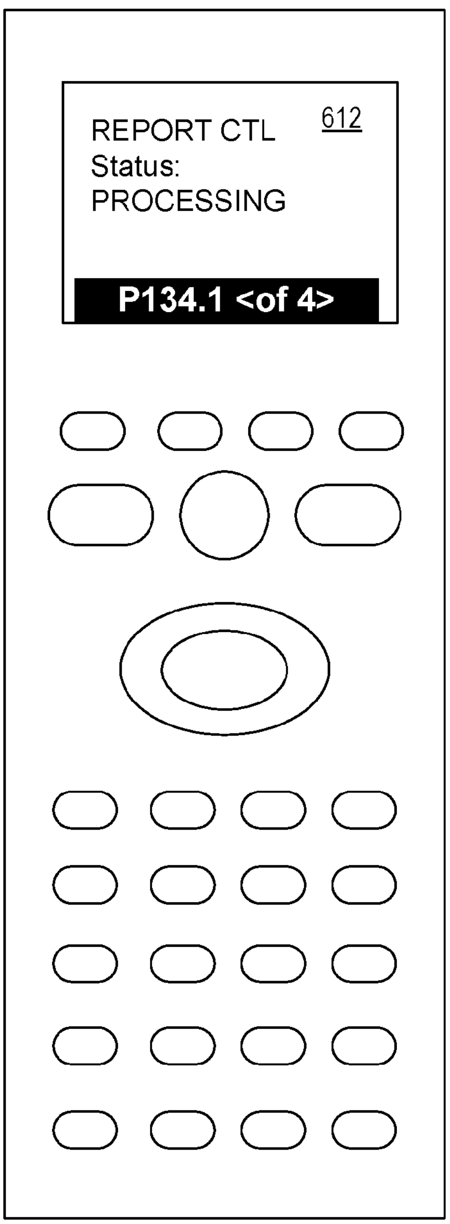
FIG. 6 illustrates examples of a gauges.
Figure 6:
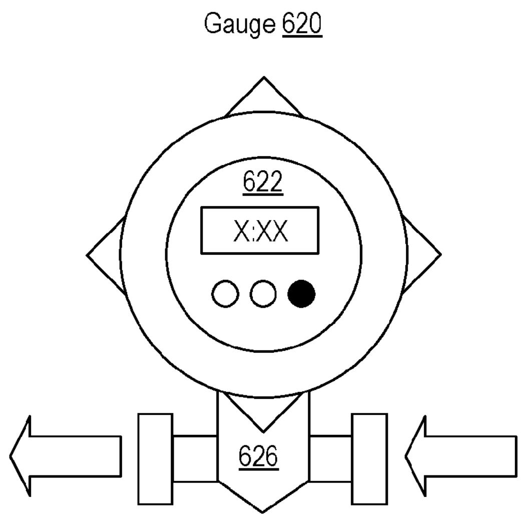

FIG. 6 shows examples of gauges 610 and 620 that include visible displays 612 and 622. As shown, the gauge 610 can be a unit that can be located at a desired location, which may be remote from equipment yet at a wellsite; whereas, the gauge 620 can be a unit that is physically coupled to equipment 626. In the example of FIG. 6, the equipment 626 can be flow equipment where the gauge 620 can be directly coupled to the equipment 626 such that movement of the equipment 626 (e.g., vibrational movement, etc.) may be carried to the gauge 620 such that the visible display 622 moves. As an example, the gauge 610 may be positioned such that it is in an enclosure; whereas, the gauge 620 may be exposed to ambient conditions. In such examples, a suitable camera (e.g., camera assembly, etc.) may be selected for a gauge in an enclosure and a suitable camera may be selected for a gauge in an ambient environment.

In the example of FIG. 6, the gauge 610 can include one or more features of the EMERSON FLOBOSS S600+ flow computer and the gauge 620 can include one or more features of the EMERSON FB1200 flow computer.

As shown, the gauge 610 can include a front panel with the visible display 612, which may be an LCD display or other type of display. As an example, the visible display 612 can provide up to eight lines of information displayed as alpha-numeric characters where, for example, displays can be menus (which may allow for access to sub-menus) or data pages. As an example, a data page may show one or more data item(s) from an internal memory storage along with associated text, units, and description. In the example visible display 612, a status line is shown (e.g., a status/ID line), which may appear on each data page to provide a page's unique page reference number in a configuration and may indicate if one or more other data pages are available for viewing (e.g., <of 4>) where an individual may use various keys to navigate to the pages. As to the unique page reference number, it can indicate the location of that data display page in a display structure for a particular configuration (e.g., consider a display structure as a table that includes rows and columns where each data page is one "cell" in the table). As to status, consider a letter such a P (prover mode), M (maintenance mode), S (standby mode), D (duty mode), W (webserver mode or lockout mode), etc., as being indicative of a mode of operation of the visible display 612.

As to types of information that may be displayed by a gauge, consider volumetric flow rate, mass flow rate, pressure, etc., where units may be in according to one or more unit standards (e.g., SI, etc.).

As to the gauge 620, it may include one or more power supply options such as, for example, an external DC supply, an external DC supply with internal battery back-up, a solar panel charging internal battery (e.g., with built-in solar regulator), etc. As an example, an internal battery may provide for powering the gauge 620 under normal operating conditions without charging for up to 19 days where, for example, charging may be via a solar panel and/or other source.

As shown, the visible display 622 may be a LCD display or other suitable display, for example, with 20 characters per line and 4 lines. As an example, the visible display 622 may be configured to switch off after a period of inactivity (e.g., configurable between 1 and 60 minutes) or be permanently left on. As the gauge 620 may be in the field and exposed to ambient conditions, the visible display 622 may be impacted by such conditions. For example, consider the visible display 622 exhibiting an increased response time and decreased contrast at temperatures below −30 degrees C. (e.g., less than −22 degrees F.). As mentioned, the gauge 620 can include an internal battery (e.g., 4.5 Ah 6.0 VDC battery), which may power the gauge 620 up to 19 days without solar charging depending on display and communications and I/O usage (e.g., consider a 6-watt solar panel or from a DC supply for backup).

As explained, various instruments may be analog and various instruments may be unconnected to a real time data gathering system. In various instance, data collection occurs intermittently through physical presence of an individual, which can impose human safety risks. Connecting instruments from different suppliers, generations, etc., which may be in different environments, can be challenging and demand regular upgrading as one or more additional instruments are added, exchanged, updated, etc.

As an example, a workflow can include identifying elements for deployment of a system and, for example, generation of a set of rules (e.g., logical operations, logical determinations, logical exceptions, etc.). In such an example, an initial configuration for deployment can be created and an appropriate machine vision suite of techniques selected. The system may be deployed using a gateway architecture such as via an edge framework, which includes hardware and software (e.g., one or more containerized applications, etc.). Once deployed, the system can be tested, for example, by reconciling alerts with actual data captured by cameras of the system. In such an example, once the appropriate confidence level is achieved, exceptions and alert rules may be tailored for further use of the system.

Figure 7:
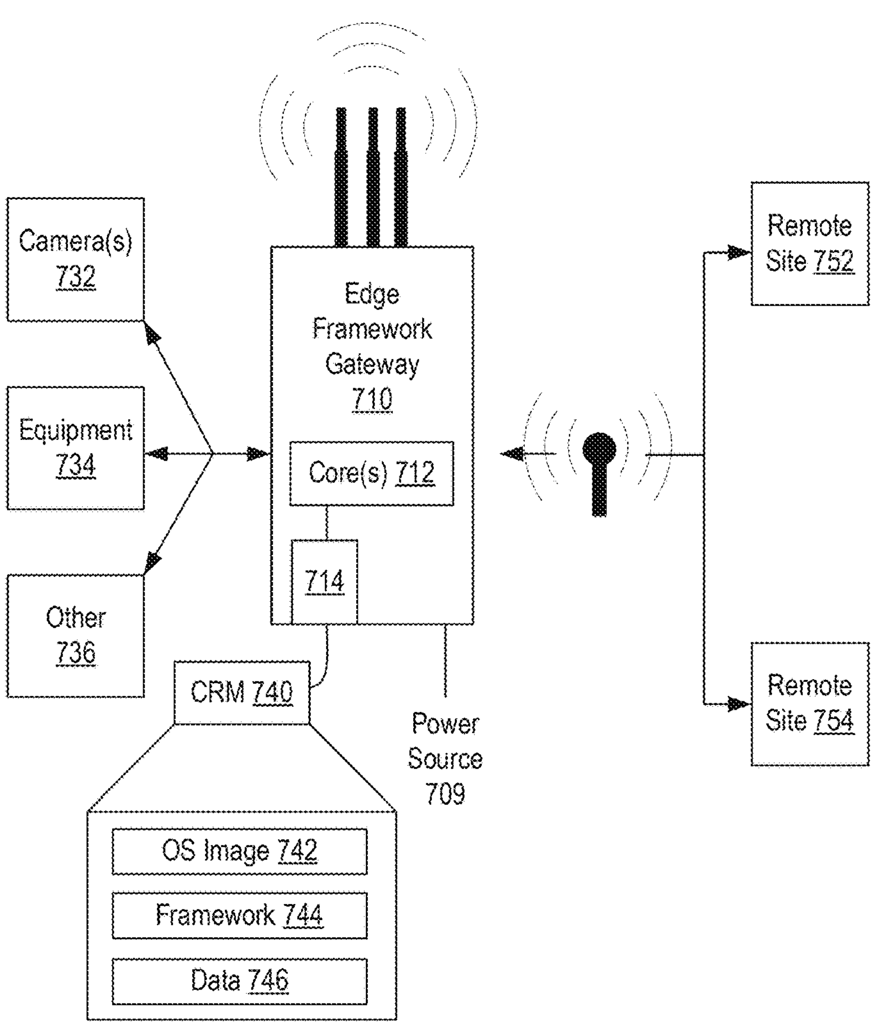
FIG. 7 illustrates an example of a system.
Figure 7:
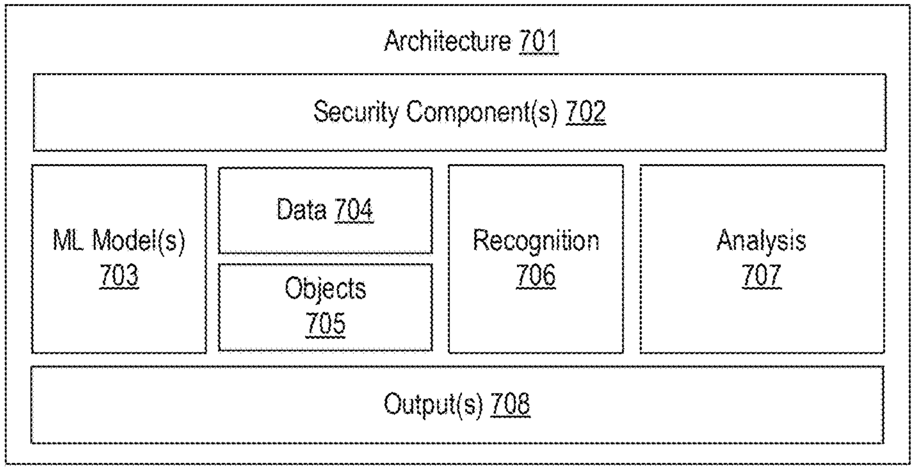

FIG. 7 shows an example of a system 700 and an example of an architecture 701. As shown, the architecture 701 can provide for one or more security components 702, one or more machine learning models 703, data 704, objects 705, recognition techniques 706, analysis techniques 707 and output(s) 708.

In the example of FIG. 7, the architecture 701 can provide for secure communications with one or more cameras (e.g., camera assemblies, drones, etc.) where captured images may be subjected to recognition, optionally using one or more trained machine learning models, where recognized features may be subjected to one or more analyses that can generate results that can be output directly and/or be transformed into appropriate output.

As an example, the system 700 can provide for identifying elements in a deployed site and generating a set of rules as to exceptions, which may be for control, alerts, learning, etc. As an example, an initial configuration for a deployment can be created where one or more appropriate computer vision techniques are selected, for example, consider techniques suitable for machine learning to generate one or more trained machine learning models. As an example, a model may be trained locally, retrained locally, trained remotely, retrained remotely, updated locally, updated remotely, etc. As an example, a machine learning model can be deployed on an edge framework gateway, for example, as a containerized application. In such an example, once deployed, a model can be tested by reconciling alerts with actual data captured by one or more cameras. In such an example, once desired confidence is achieved, rules, exceptions, etc., may be finalized and the model implemented.

As an example, where desired confidence is not achieved, one or more features may be executed but with limited effect (e.g., limited control, alert issuance, etc.). In such an example, information may be tagged for review, which may be local review and/or remote review. As to local review, where an individual travels to a site, an interface may provide a notice that information is available for review. In such an example, the individual may provide feedback where such feedback may be suitable to improve confidence such that increased effect can be achieved, which may increase automation and reduce demand for human intervention, review, etc.

As an example, an edge framework may utilize a machine learning platform where various components can be containerized. In such an example, a container or containers can be embedded into an edge framework gateway. For example, consider building one or more executable code images and then installing one or more of such one or more executable code images. As an example, a container can be built to include machine learning platform executable code for execution of an image classification, image recognition, etc., machine learning model, which may be pre-trained. In such an example, an initial build may take more time than a subsequent build. As an example, a trained machine learning model executable on an edge framework gateway may be made available via one or more network interfaces.

As an example, a method can include selecting a new model for training or selecting an existing model for retraining, converting the model into a compressed flat buffer as a file (e.g., using a converter, etc.), deploying the compressed file, loading the compressed file into an edge framework gateway, and, for example, optimization, which may include quantizing by converting 32-bit floats to more efficient 8-bit integers and/or for execution on a particular core, GPU, etc.

As an example, an embedded approach as to utilization, training, etc., of a machine learning model on an edge framework gateway can provide for reduced latency (e.g., without a round-trip to a server), increased security (e.g., without data leaving the gateway), decreased demand for Internet connectivity, reduced size (e.g., reduced model and binary size) and reduced power consumption (e.g., efficient inference, lack of Internet network connections, etc.).

As an example, the architecture 701 may provide for a level or levels of automation. For example, consider automated gauge detection via image-based recognition, which may implement one or more machine learning models. In such an example, a camera may be positioned to have one or more gauges within a field of view (FOV) where image-based recognition can identify the one or more gauges, including, for example, gauge model, gauge operational mode, etc. In such an approach, the system 700 may automatically generate output from a scene where the output can be assessed as to capabilities for field equipment and operations thereof. For example, where a gauge such as the gauge 610 is identified, a capability may be to reduce manual reading by an individual by automated image-based recognition of information rendered to the visible display 612.

As another example, consider identification of a gauge such as the gauge 620 where, given that the gauge 620 is directly coupled to the equipment 626, a capability may be to acquire information from the display 622 along with vibration information, which may be analyzed with respect to movement of a camera to provide information about fluid flowing in the equipment 626. For example, consider leveraging image stabilization circuitry of a camera, which may be equipped with an accelerometer, gyroscope, etc., that can sense camera movement and image artifacts that result from vibration of the equipment 626. As an example, image stabilization circuitry may be enabled and/or disabled as appropriate while capturing images of the gauge 620. In such an example, images captured with and without image stabilization may be utilized to determine vibrational movement of the equipment 626. As an example, image stabilization circuitry may be enabled to capture images of the display 622 of the gauge 620 (e.g., to provide clearer images of the information rendered to the display 622) and then disabled to capture images of the gauge 620 and/or the equipment 626 for purposes of vibration analysis.

As mentioned with respect to FIG. 5, a camera may provide information as to heat and/or other physical phenomena. As an example, the system 700 of FIG. 7 may provide for discovery of scenarios where one or more cameras can be utilized to effectively improve operations at a field site where gauge information and equipment information can be acquired using the one or more cameras.

As an example, the architecture 701 can include an interface where an output can be a control trigger that can call for an action or actions by a piece or pieces of equipment, which may include one or more cameras. In such an example, consider the system 700 as providing output as to a field operation and output as to a camera operation.

As shown, the system 700 can include a power source 709 (e.g., solar, generator, battery, grid, etc.) that can provide power to an edge framework gateway 710 that can include one or more computing cores 712 and one or more media interfaces 714 that can, for example, receive a computer-readable medium 740 that may include one or more data structures such as an operating system (OS) image 742, a framework 744 and data 746. In such an example, the OS image 742 may cause one or more of the one or more cores 712 to establish an operating system environment that is suitable for execution of the one or more applications. For example, the framework 744 may be an application suitable for execution in an established operating system in the edge framework gateway 710.

In the example of FIG. 7, the edge framework gateway 710 ("EF") can include one or more types of interfaces suitable for receipt and/or transmission of information. For example, consider one or more wireless interfaces that may provide for local communications at a site such as to one or more pieces of local equipment, which can include one or more cameras 732, equipment 734 and other 736 and/or remote communications to one or more remote sites 752 and 754.

As an example, the EF 710 may be installed at a site that is some distance from a city, a town, etc. In such an example, the EF 710 may be accessible via a satellite communication network and/or one or more networks.

A communications satellite is an artificial satellite that can relay and amplify radio telecommunication signals via a transponder. A satellite communication network can include one or more communication satellites that may, for example, provide for one or more communication channels. As of 2021, there are about 2,000 communications satellites in Earth orbit, some of which are geostationary above the equator such that a satellite dish antenna of a ground station can be aimed permanently at a satellite rather than tracking the satellite. As an example, information may be acquired using one or more types of satellites, including, for example, imagery satellites (e.g., Sentinel, etc.).

High frequency radio waves used for telecommunications links travel by line-of-sight, which may be obstructed by the curve of the Earth. Communications satellites can relay signal around the curve of the Earth allowing communication between widely separated geographical points. Communications satellites can use one or more frequencies (e.g., radio, microwave, etc.), where bands may be regulated and allocated.

Satellite communication tends to be slower and more costly than other types of electronic communication due to factors such as distance, equipment, deployment and maintenance. For wellsites that do not have other forms of communication, satellite communication can be limiting in one or more aspects. For example, where a controller is to operate in real-time or near real-time, a cloud-based approach to control may introduce too much latency.

As shown in the example of FIG. 7, the EF 710 may be deployed where it can operate locally with the one or more cameras 732, one or more pieces of equipment 734, etc., which may be for purposes of control. As an example, the EF 710 may include switching and/or communication capabilities, for example, for information transmission between equipment, etc.

As desired, from time to time, communication may occur between the EF 710 and one or more remote sites 752, 754, etc., which may be via satellite communication where latency and costs are tolerable. As an example, the CRM 740 may be a removable drive that can be brought to a site via one or more modes of transport. For example, consider an air drop, a human via helicopter, plane or boat, etc.

As to an air drop, consider dropping an electronic device that can be activated locally once on the ground or while being suspended by a parachute en route to ground. Such an electronic device may communicate via a local communication system such as, for example, a local WiFi, BLUETOOTH, cellular, etc., communication system. In such an example, one or more data structures may be transferred from the electronic device (e.g., as including a CRM) to the EF 710. Such an approach can provide for local control where one or more humans may or may not be present at the site. As an example, an autonomous and/or human controllable vehicle at a site may help to locate an electronic device and help to download its payload to an EF such as the EF 710. For example, consider a local drone or land vehicle that can locate an air dropped electronic device and retrieve it and transfer one or more data structures from the electronic device to an EF, directly and/or indirectly. In such an example, the drone or land vehicle may establish communication with and/or read data from the electronic device such that data can be communicated (e.g., transferred to one or more EFs).

As to drones, consider a drone that includes one or more features of one or more of the following types of drones DJI MATRICE 210 RTK, DJI MATRICE 600 PRO, ELISTAIR ORION tethered drone, FREEFLY ALTA 8, GT AERONAUTICS GT380, SKYDIO 2, SENSEFLY EBEE X, SKYFRONT PERIMETER 8, VANTAGE ROBOTICS SNAP, VIPER VANTAGE and YUNEEC H920 PLUS TORNADO. The DJI MATRICE 210 RTK can have a takeoff weight of 6.2 g (include battery and max 1.2 kg payload), a maximum airspeed of 13-30 m/s (30-70 mph), a range of 500 m-1 km with standard radio/video though it may be integrated with other systems for further range from base, a flight time of 15-30 minutes (e.g., depending on battery and payload choices, etc.). As an example, a gateway may be a mobile gateway that includes one or more features of a drone and/or that can be a payload of a drone.

As shown in FIG. 7, an EF may execute within a gateway such as, for example, an AGORA gateway (e.g., consider one or more processors, memory, etc., which may be deployed as a "box" that can be locally powered and that can communicate locally with other equipment via one or more interfaces). As an example, one or more pieces of equipment may include computational resources that can be akin to those of an AGORA gateway or more or less than those of an AGORA gateway. As an example, an AGORA gateway may be a network device.

As an example, a gateway can include one or more features of an AGORA gateway (e.g., v. 202, v. 402, etc.) and/or another gateway. For example, consider an INTEL ATOM E3930 or E3950 dual core with DRAM and an eMMC and/or SSD. Such a gateway may include a trusted platform module (TPM), which can provide for secure and measured boot support (e.g., via hashes, etc.). A gateway may include one or more interfaces (e.g., Ethernet, RS485/422, RS232, etc.). As to power, a gateway may consume less than about 100 W (e.g., consider less than 10 W or less than 20 W). As an example, a gateway may include an operating system (e.g., consider LINUX DEBIAN LTS). As an example, a gateway may include a cellular interface (e.g., 4G LTE with global modem/GPS, etc.). As an example, a gateway may include a WIFI interface (e.g., 802.11 a/b/g/n). As an example, a gateway may be operable using AC 100-240 V, 50/60 Hz or 24 VDC. As to dimensions, consider a gateway that has a protective box with dimensions of approximately 10 in×8 in×4 in (e.g., 25 cm×20.3 cm×10.1 cm).

As an example, a gateway may be part of a drone. For example, consider a mobile gateway that can take off and land where it may land to operatively couple with equipment to thereby provide for control of such equipment. In such an example, the equipment may include a landing pad. For example, a drone may be directed to a landing pad where it can interact with equipment to control the equipment. As an example, a wellhead can include a landing pad where the wellhead can include one or more sensors (e.g., temperature and pressure) and where a mobile gateway can include features for generating fluid flow values using information from the one or more sensors. In such an example, the mobile gateway may issue one or more control instructions (e.g., to a choke valve, a pump, etc.).

As an example, a gateway may include hardware (e.g. circuitry) that can provide for operation of a drone. As an example, a gateway may be a drone controller and a controller for other equipment where the drone controller can position the gateway (e.g., via drone flight features, etc.) such that the gateway can control the other equipment.

As an example, a mobile gateway may be operable in one or more safety modes. For example, if conditions change, a mobile gateway may be able to issue one or more safety instructions and then fly away to protect the mobile gateway. In such an example, the mobile gateway and data therein (e.g., a black box) may be kept safe. Such an approach may be utilized, for example, where an operational issue arises, where a site is invaded by one or more intruders, etc. For example, consider an intruder that aims to interfere with equipment, which may be to damage equipment, alter the equipment, steal fluid, etc. In such an example, a mobile gateway may detect and/or receive a detection signal and place equipment in a suitable state and then fly away to protect itself. Where an intruder departs, the mobile gateway may return and run an assessment to determine whether a return to operation is possible or not. As mentioned, where a gateway include satellite communication circuitry, a gateway may issue one or more signals such as one or more distress or SOS types of signals that may alert as to a threat, which may be imminent and/or in progress.

As an example, a gateway itself may include one or more cameras such that the gateway can record conditions. For example, consider a motion detection camera that can detect the presence of an object. In such an example, an image of the object and/or an analysis (e.g., image recognition) signal thereof may be transmitted (e.g., via a satellite communication link) such that a risk may be assessed at a site that is distant from the gateway.

As an example, a gateway may include one or more accelerometers, gyroscopes, etc. As an example, a gateway may include circuitry that can perform seismic sensing that indicates ground movements. Such circuitry may be suitable for detecting and recording equipment movements and/or movement of the gateway itself.

As explained, a gateway can include features that enhance its operation at a remote site that may be distant from a city, a town, etc., such that travel to the site and/or communication with equipment at the site is problematic and/or costly. As explained, a gateway can include an operating system and memory that can store one or more types of applications that may be executable in an operating system environment.

Such applications can include one or more security applications, one or more control applications, one or more simulation applications, etc.

As an example, various types of data may be available, for example, consider real-time data from equipment and ad hoc data. In various examples, data from sources connected to a gateway may be real-time, ad hoc data, sporadic data, etc. As an example, lab test data may be available that can be used to fine tune one or more models (e.g., locally, etc.). As an example, data from a framework such as the AVOCET framework may be utilized where results and/or data thereof can be sent to the edge. As an example, one or more types of ad hoc data may be stored in a database and sent to the edge.

As explained, various systems may operate in a local manner, optionally without access to a network such as the Internet. For example, a site may be relatively remote where satellite communication exists as a main mode of communication, which may be costly and/or low bandwidth. In such scenarios, security may resort to local features rather than a remote feature such as a remote authentication server.

An authentication server can provide a network service that applications use to authenticate credentials, which may be or include account names and passwords of users (e.g., human and/or machine). When a client submits a valid credential or credentials to an authentication server, the authentication server can generate a cryptographic ticket that the client can subsequently use to access one or more services.

As explained, reading analog gauges, disconnected meters, charts, recorders, etc., can be challenging and may be subject to human error. Data acquired via humans can be intermittent, prone to human errors and fraught with HSE risks. Such factors makes sub-optimal equipment operation more likely due in part to lack of real-time access to data resulting in elevated non-productive time (NPT) and a consequent increase in field operating cost.

A system such as the system 700 of FIG. 7 can utilize one or more visual analytics applications deployed on a gateway. In such an example, data generated by an application can be used to monitor and optimize equipment remotely and/or autonomously.

A system such as the system 700 of FIG. 7 can provide for reduced HSE risk, increased equipment uptime and reduced operating cost.

Figure 8:
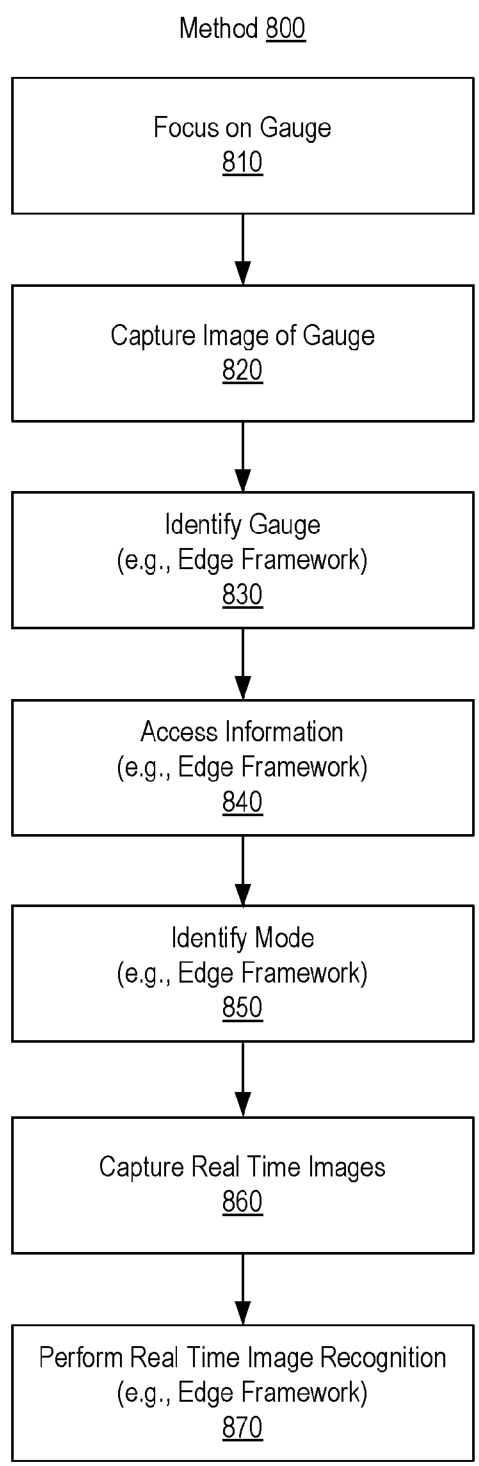
FIG. 8 illustrates an example of a method.

FIG. 8 shows an example of a method 800 that includes a focus block 810 for focusing on a gauge, a capture block 820 for capturing an image of the gauge, an identification block 830 for identifying the gauge (e.g., model, etc.), an access block 840 for accessing information associated with the gauge (e.g., manual for the model), an identification block 850 for identifying a mode of operation of the gauge, a capture block 860 for capturing real time image that include the gauge, and a performance block 870 for performing real time image-based recognition, which can provide information as to gauge readouts and/or gauge condition (e.g., temperature, power level, movement, etc.).

Figure 9:
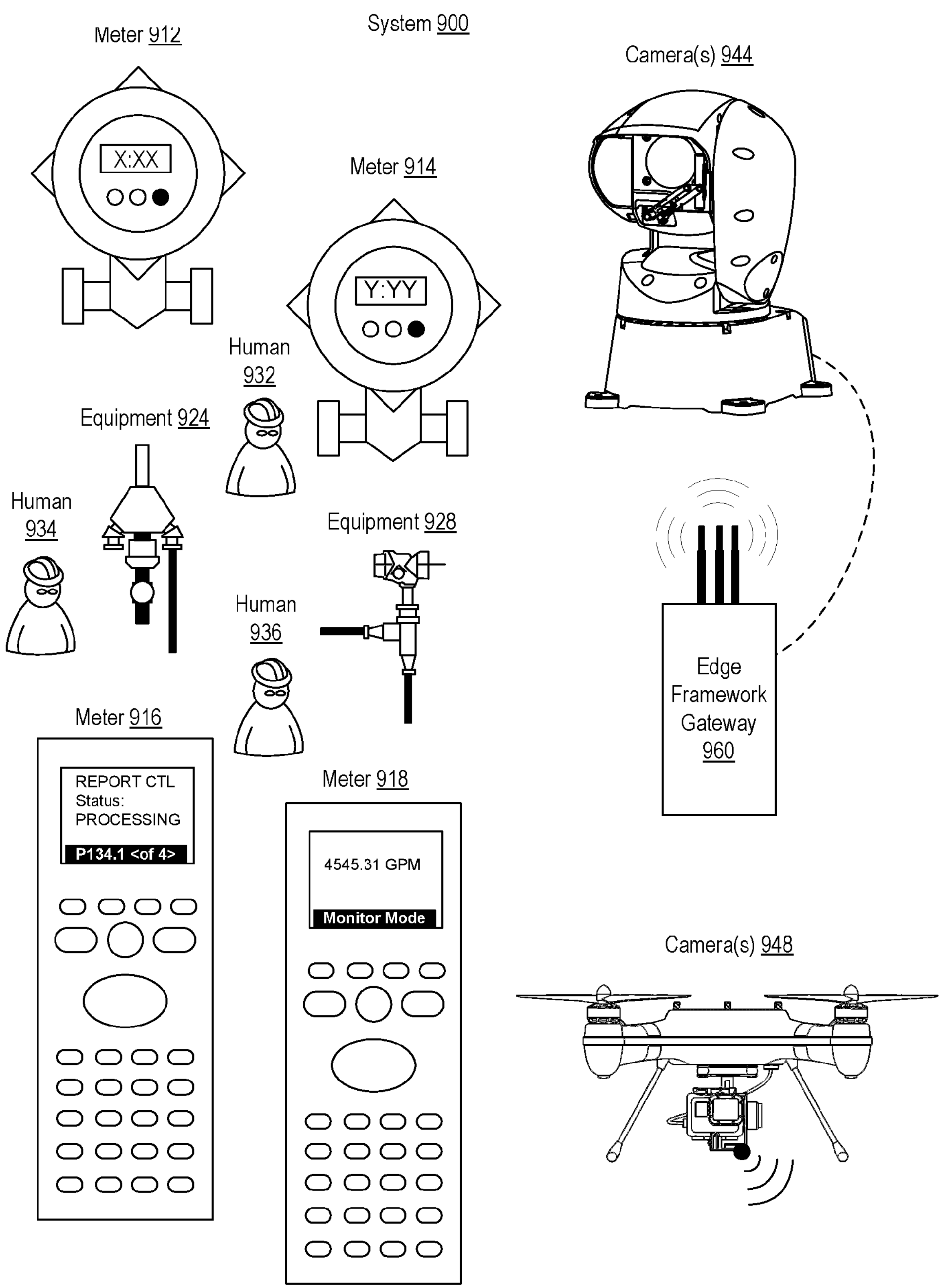
FIG. 9 illustrates an example of a system.

FIG. 9 shows an example of a system 900 that includes meters 912, 914, 916 and 918 (e.g., gauges), equipment 924 and 928 and humans 934 and 936. As shown, the system 900 also includes one or more mounted cameras 944 and one or more mobile cameras 948, along with an edge framework gateway 960. In such an example, the edge framework gateway 960 can provide information for conditions at a field site and optionally issue one or more notifications based on one or more conditions. In such an example, the edge framework gateway 960 may generate a report that can be utilized to optimize a field operation, which may involve an implementation of a higher level of automation (e.g., less frequent involvement of the humans 934 and 936).

Figure 10:
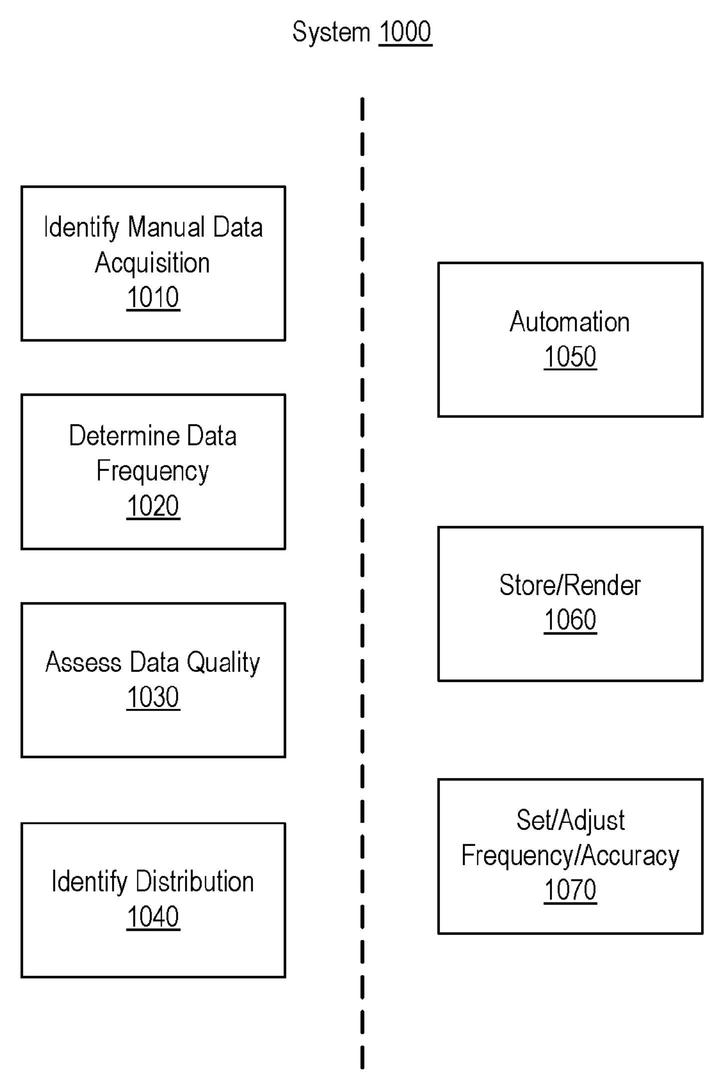
FIG. 10 illustrates an example of a system.

FIG. 10 shows an example of a system 1000 that can be divided into portions where one portion pertains primarily to identification of areas for improvement and another portion pertains primarily to implementation of one or more improvements. As shown, the system 1000 include various blocks such as an identification block 1010 for identifying manual data acquisition (e.g., via image-based tracking of human(s)), a determination block 1020 for determining data frequency (e.g., via human movement), an assessment block 1030 for assessing quality of human acquired data (e.g., via reading a gauge or gauges), and an identification block 1040 for identifying how the human acquired data are distributed (e.g., via hand, via machine, etc.) and to whom or what.

In the example of FIG. 10, the blocks 1010, 1020, 1030 and 1040 can provide a basis for operations of an automation block 1050, a storage and/or render block 1060 and/or a set/adjust block 1070. For example, the automation block 1050 may discover opportunities for automation such that image-based approaches can supplement and/or supplant human-based approaches. As to the storage and/or render block 1060, it may provide for more effective storage and/or rendering of information that, previously, has been limited by on-site human reading and recording, which, as mentioned, may be subject to human error. As to the set/adjust block 1070, it can provide for adjusting frequency of image-based readings, which may take into account accuracy. For example, consider acquiring images of a gauge in a manner where image-based recognition can accurately determine a numeric value as presented on a display of the gauge.

Figure 11:
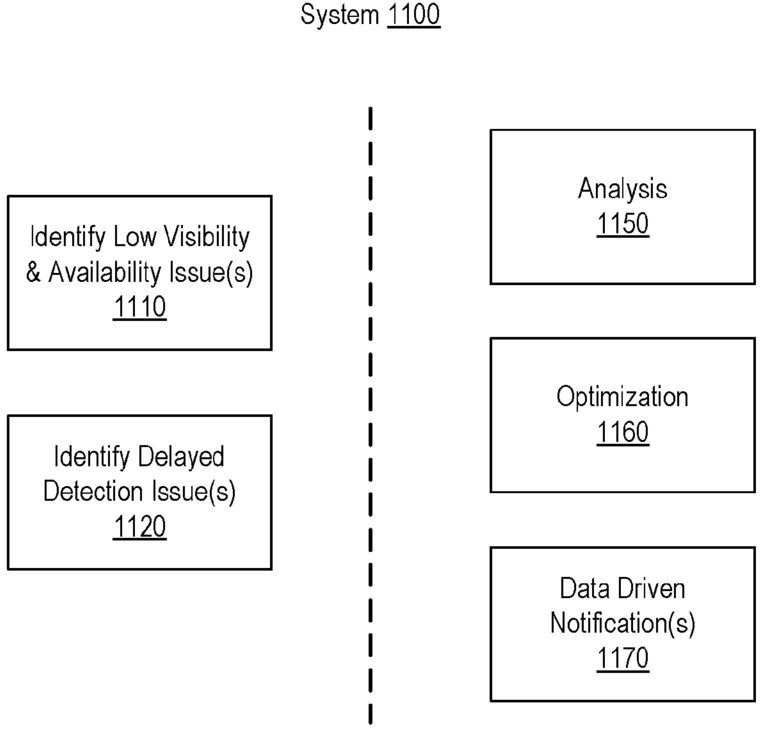
FIG. 11 illustrates an example of a system.

FIG. 11 shows an example of a system 1100 that includes an identification block 1110 for identifying one or more low visibility and availability data issues and an identification block 1120 for identifying one or more delayed detection issues. In such an example, an analysis block 1150 can provide for analyzing the identified issue or issues of the blocks 1110 and 1120, for example, to determine correlation, relatedness, etc., such that an optimization block 1160 can optimize image capture to address the issue or issues. In such an example, an optimized image capture system can be implemented that can provide for issuance of data driven notifications per a notification block 1170.

Figure 12:
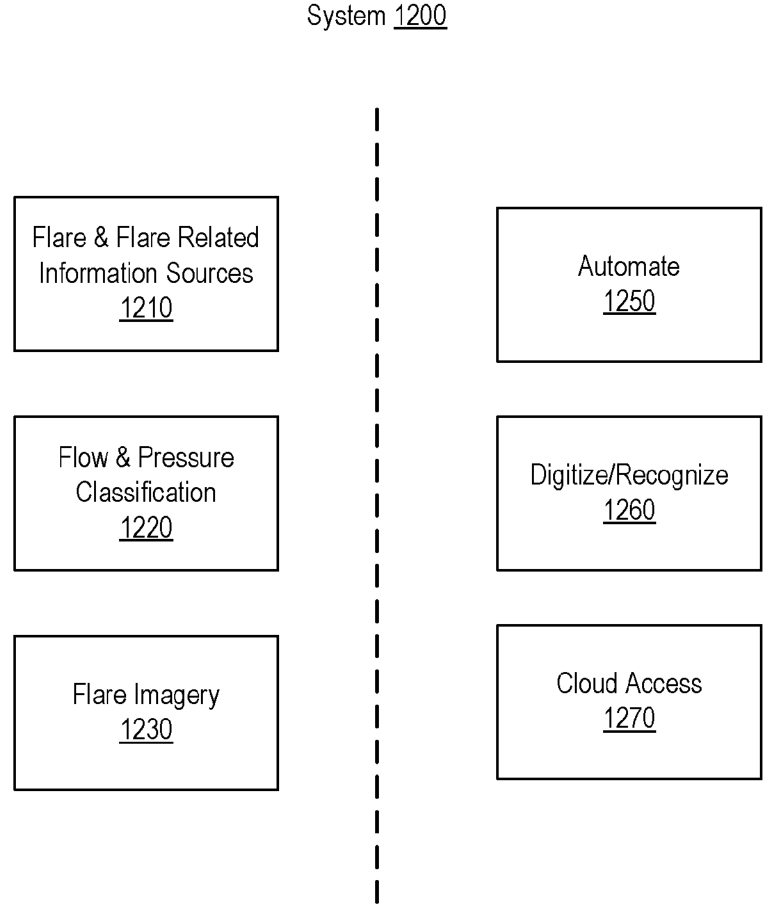
FIG. 12 illustrates an example of a system.

FIG. 12 shows an example of a system 1200 that includes a flare and flare related information sources block 1210, a flow and pressure classification block 1220 and a flare imagery block 1230. In such an example, the system 1200 may be within a field environment such as that of FIG. 2 where one or more flares may be present (see, e.g., 276-1 and 276-2) and/or FIG. 3 where one or more flares may be present (see, e.g., 368). The system 1200 of FIG. 12 may aim to reduce flaring and/or to reduce flare emissions (e.g., improve combustion, etc.).

In the example of FIG. 12, the system 1200 can include an automation block 1250 that can generate one or more automatable sequences for improved flaring, a digitization/recognition block 1260 for digitization and/or recognition of information in images, and a cloud access block 1270 for transmitting at least a portion of information from images to a cloud platform. In such an example, the information may be accessible via a web browser application such that flaring can be monitored from one or more locations, optionally as to flaring at one or more field sites. In the example of FIG. 12, the automation block 1250 may provide for control of one or more operations at a site based at least in part on images to improve flaring.

Figure 13:
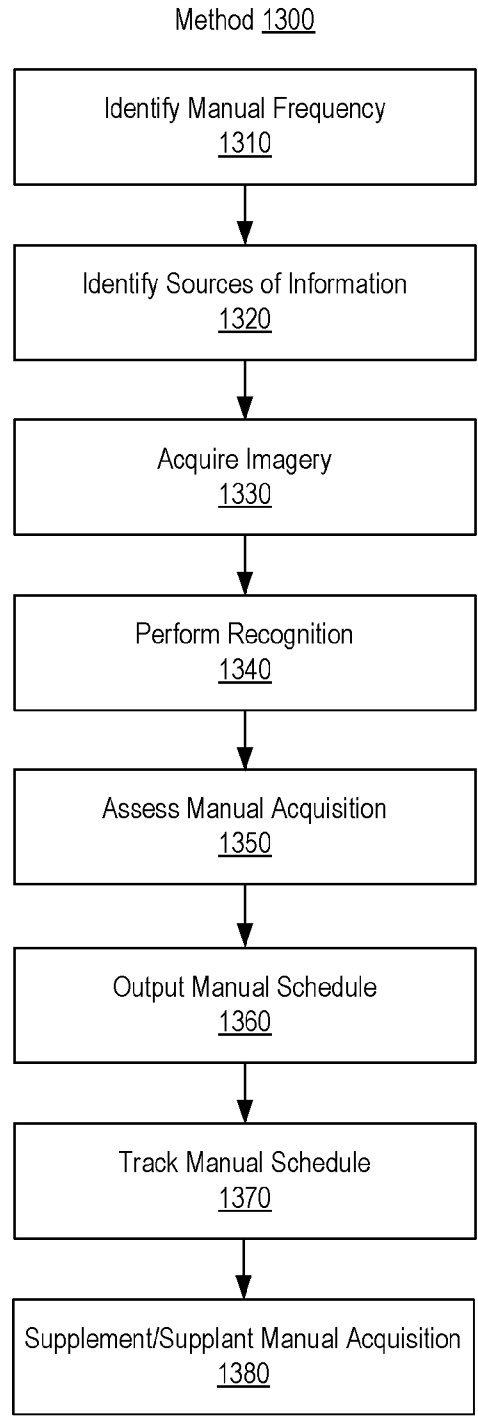
FIG. 13 illustrates an example of a method.

FIG. 13 shows an example of a method 1300 that includes an identification block 1310 for identifying a manual frequency of gauge reading (e.g., meter reading), an identification block 1320 for identifying one or more sources of information (e.g., a gauge, gauges, equipment, etc.), an acquisition block 1330 for acquiring imagery of the one or more sources, a performance block 1340 for performing image-based recognition using the acquired imagery, an assessment block 1350 for assessing the manual acquisition (e.g., as to appropriateness for a given goal or goals), an output block 1360 for outputting a determined manual schedule, a tracking block 1370 for tracking the manual schedule, and a supplementation/supplantation block 1380 for supplementing and/or supplanting one or more features of the manual schedule (e.g., to improve data quality, reduce manual involvement, etc.).

Figure 14:
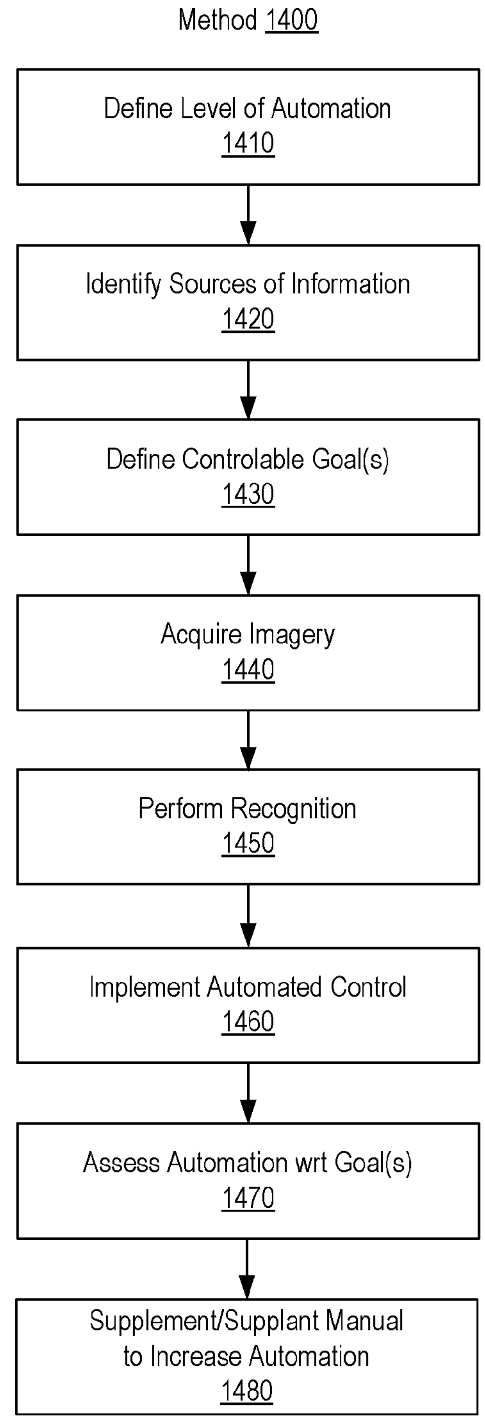
FIG. 14 illustrates an example of a method.

FIG. 14 shows an example of a method 1400 that includes a definition block 1410 for defining a level of automation, an identification block 1420 for identifying sources of information, a definition block for defining one or more controllable goals, an acquisition block 1440 for acquiring imagery (e.g., imagery data), a performance block 1450 for performing recognition (e.g., image recognition, etc.), an implementation block 1460 for implementing an increased amount of automated control, an assessment block 1470 for assessing automation with respect to the one or more goals, and a supplementation/supplantation block 1480 for supplementing and/or supplanting one or more features to increase automation.

As an example, a method can include identifying information to achieve a level of automation and introducing one or more cameras to a field site to provide such information via image capture. For example, consider a goal of achieving greater than X percent automation for various parameters at a field site where such automation can provide for a reduction in human intervention and/or improved operation of equipment at the field site. In such an example, a method can identify particular information such as flowrate information with respect to compressor operation, which may pertain to artificial lift such as gas-lift at the field site to help produce fluid from a reservoir. In such an example, artificial lift operations for one or more wells may be increased as to operation and/or otherwise improved.

Figure 15:
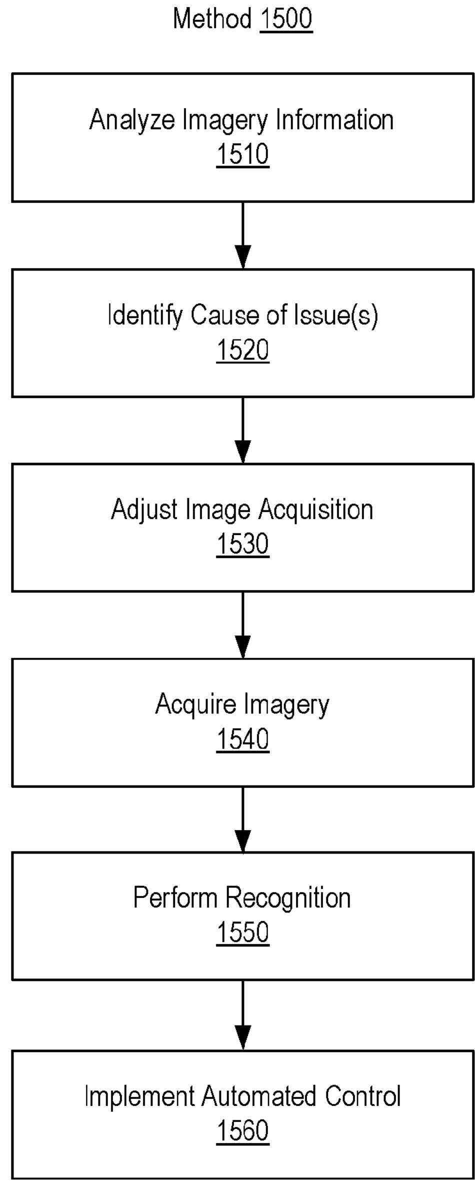
FIG. 15 illustrates an example of a method.

FIG. 15 shows an example of a method 1500 that includes an analysis block 1510 for analyzing imagery information, an identification block 1520 for identifying one or more causes of one or more issues, an adjustment block 1530 for adjusting image acquisition, an acquisition block 1540 for acquiring imagery, a performance block 1550 for performing image-based recognition on the acquired imagery, and an implementation block 1560 for implementing automated control based at least in part on the image-based recognition to address the one or more issues (e.g., to control for occurrence or occurrences of conditions associated with the one or more causes).

Figure 16:
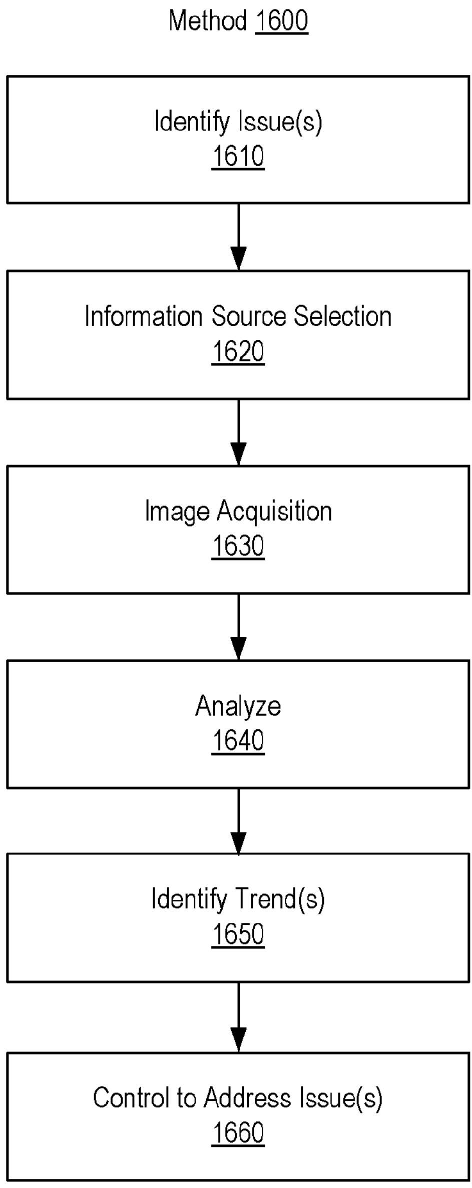
FIG. 16 illustrates an example of a method.

FIG. 16 shows an example of a method 1600 that includes an identification block 1610 for identifying one or more issues, an information source selection block 1620 for selecting one or more information sources, an image acquisition block 1630 for acquiring imagery of at least one of the one or more information sources, an analysis block 1640 for analyzing the acquired imagery, an identification block 1650 for identifying one or more trends via the analysis, and a control block 1660 for generation and/or implementation of a control strategy to address the one or more issues.

As an example, the method 1600 can include identifying issues pertaining to gas-lift operations where trends, patterns, etc., can be identified. In such an example, decisions may be made based at least in part on imagery data as to flaring of gas and directing gas to gas-lift operations. For example, consider an analysis of backpressure relationships and gas injection/gas-lift relationships. In such an example, a system may improve utilization of gas and production of liquid at a field site that may include a number of wells.

Figure 17:
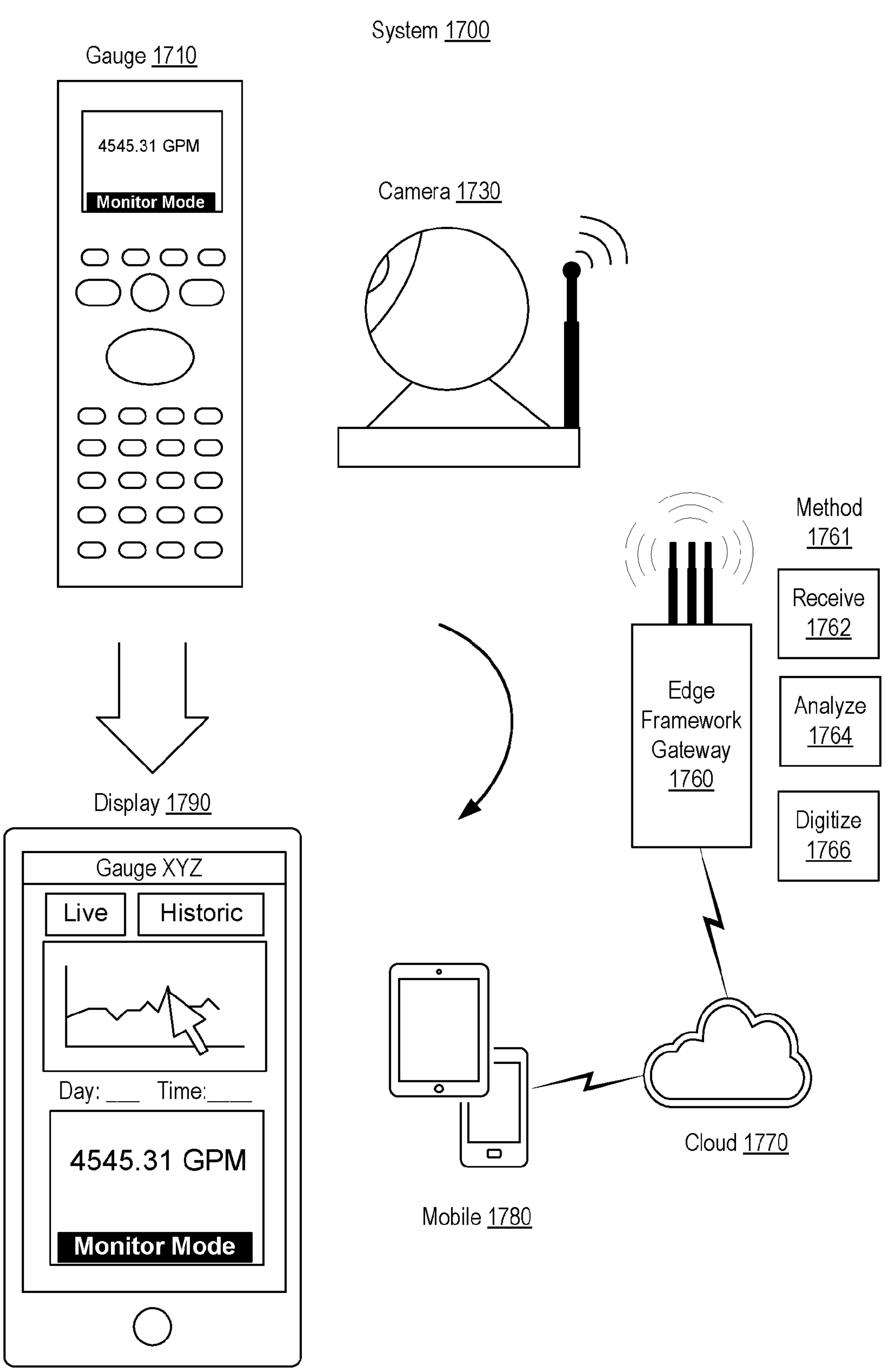
FIG. 17 illustrates an example of a system and an example of a method.

FIG. 17 shows an example of a system 1700 that includes a gauge 1710, a camera 1730, an edge framework gateway 1760, a cloud platform 1770, and one or more mobile devices 1780 that include a display 1790. As shown, the camera 1730 can capture images of the gauge 1710 and transmit image data to the edge framework gateway 1760, which may perform a method 1761 that includes a reception block 1762 for receiving image data, an analysis block 1764 for analyzing received image data, and a digitization block 1766 for digitizing information based on the analyzing. In such an example, the edge framework gateway 1760 may reduce the amount of data as to relevant information. For example, consider a digital image being reduced to a digital value, which may be with respect to time. As mentioned, the edge framework gateway 1760 may be in a remote location with limited access to a network and limited bandwidth. By reducing the amount of data from a pixel image to a data value, the bandwidth can be reduced, for example, for satellite transmission to the cloud platform 1770. In turn, the one or more mobile devices 1780 can access the data value from the cloud platform 1770 with lesser bandwidth demands compared to accessing an image of the gauge 1710 (e.g., or its display) in its entirety.

In the example of FIG. 17, an application can provide for generation of a graphical user interface (GUI) that can be rendered to the display 1790. For example, consider an application that can transform a data value or several data values into a form that mimics the display of the gauge 1710. For example, consider receiving a digital data value for 4541.31 gallons per minute (GPM) from the cloud platform 1770 and rendering the value graphically in a form that mimics the display of the gauge 1710. As shown in the example of FIG. 17, an application may render a plot and/or other graphic with respect to time, etc. As an example, an application may provide for selection of a gauge from a plurality of gauges, selection of live data and/or historic data, etc. As explained, the system 1700 may provide for remote monitoring of a gauge in a gauge-like GUI without transmission of an image of the gauge.

As mentioned, one or more machine learning techniques may be utilized to enhance process operations, a process operations environment, a communications framework, etc. As explained, various types of information can be generated via operations of a communications framework where such information may be utilized for training one or more types of machine learning models to generate one or more trained machine learning models, which may be deployed within one or more frameworks, environments, etc.

As to types of machine learning models, consider one or more of a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine model may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange to various other frameworks.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method can include various actions that can operate on a dataset to train a ML model. As an example, a dataset can be split into training data and test data where test data can provide for evaluation. A method can include cross-validation of parameters and best parameters, which can be provided for model training.

The TENSORFLOW framework can run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system based platforms. TENSORFLOW computations can be expressed as stateful dataflow graphs; noting that the name TENSORFLOW derives from the operations that such neural networks perform on multidimensional data arrays. Such arrays can be referred to as "tensors".

As an example, a device may utilize TENSORFLOW LITE (TFL) or another type of lightweight framework. TFL is a set of tools that enables on-device machine learning where models may run on mobile, embedded, and IoT devices. TFL is optimized for on-device machine learning, by addressing latency (no round-trip to a server), privacy (no personal data leaves the device), connectivity (Internet connectivity is demanded), size (reduced model and binary size) and power consumption (e.g., efficient inference and a lack of network connections). Multiple platform support, covering ANDROID and iOS devices, embedded LINUX, and microcontrollers. Diverse language support, which includes JAVA, SWIFT, Objective-C, C++, and PYTHON. High performance, with hardware acceleration and model optimization. Machine learning tasks may include, for example, image classification, object detection, pose estimation, question answering, text classification, etc., on multiple platforms.

Figure 18:
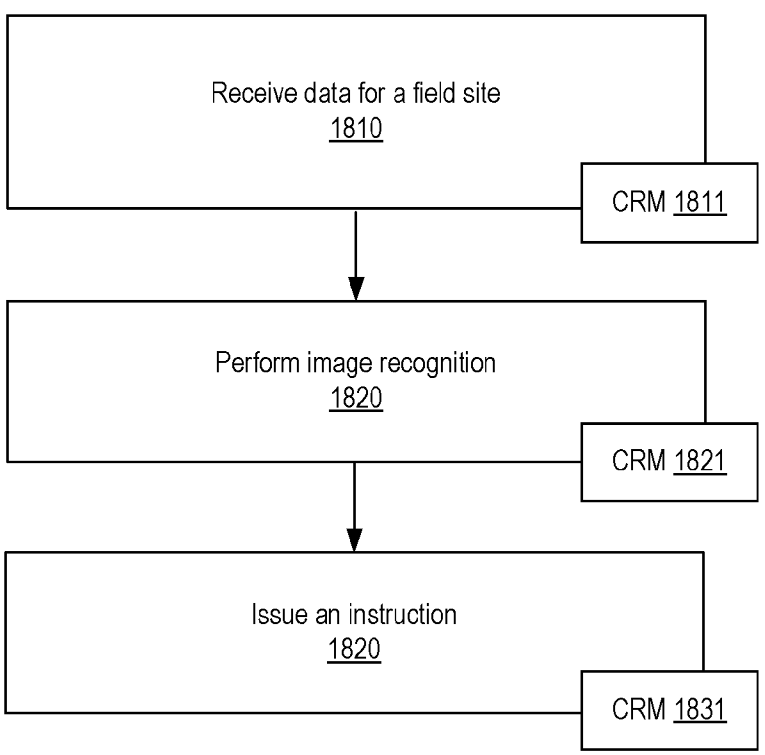
FIG. 18 illustrates an example of a method and an example of a system.
Figure 18:
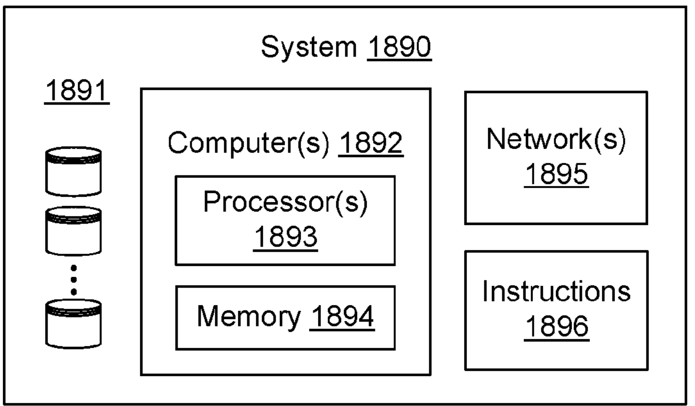

FIG. 18 shows an example of a method 1800 that includes a reception block 1810 for receiving data for a field site by an edge framework gateway at the field site, where the data correspond to equipment operations at the field site and where the data include imagery data acquired by one or more cameras at the field site; a performance block 1820 for performing image recognition on the imagery data to recognize gauges and to recognize content displayed on the gauges via execution of a machine learning model on the edge framework gateway; and an issuance block 1830 for issuing an instruction based at least in part on the recognized content displayed on the gauges. For example, consider an instruction for a notification, a control action, a training action, a scheduling action, etc.

In the example of FIG. 18, a system 1890 includes one or more information storage devices 1891, one or more computers 1892, one or more networks 1895 and instructions 1896. As to the one or more computers 1892, each computer may include one or more processors (e.g., or processing cores) 1893 and memory 1894 for storing the instructions 1896, for example, executable by at least one of the one or more processors. As an example, a computer may include one or more network interfaces (e.g., wired or wireless), one or more graphics cards, a display interface (e.g., wired or wireless), etc.

The method 1800 is shown along with various computer-readable media blocks 1811, 1821 and 1831 (e.g., CRM blocks). Such blocks may be utilized to perform one or more actions of the method 1800. For example, consider the system 1890 of FIG. 18 and the instructions 1896, which may include instructions of one or more of the CRM blocks 1811, 1821 and 1831.

A method can include receiving data for a field site by an edge framework gateway at the field site, where the data correspond to equipment operations at the field site and where the data include imagery data acquired by one or more cameras at the field site; performing image recognition on the imagery data to recognize gauges and to recognize content displayed on the gauges via execution of a machine learning model on the edge framework gateway; and issuing an instruction based at least in part on the recognized content displayed on the gauges. In such an example, the machine learning model can be a trained machine learning model. As an example, a method can include training a machine learning model, for example, at least in part by assessing performance of image recognition. As an example, a method can include training and/or retraining of one or more machine learning models.

As an example, a method can include accessing instructional information for one or more recognized gauges and, for example, contextualizing recognized content of one or more of the recognized gauges based at least in part on the instructional information.

As an example, image recognition can provide recognized content displayed on gauges in an alphanumeric format. For example, consider a needle of a gauge being recognized as a numeric value (e.g., within a span of the gauge). As another example, a numeric display may be transformed to a numeric value. Such approaches can provide for compression of relevant information (e.g., a numeric value versus an image, etc.). As an example, a method can include transmitting at least a portion of recognized content to a remote site via a satellite. In such an example, a method can include rendering the at least a portion of the recognized content to a display with a virtual representation of at least a portion of one of the gauges. In such an example, the display may present a virtual representation of a gauge at a field site.

As an example, a method can include comparing recognized content to human transcribed content for one or more gauges. In such an example, the method can include determining an error rate for the recognized content, an error rate for the human transcribed content or error rates for the recognized content and the human transcribed content. In such an example, a method can include deciding to increase automation at the field site based at least in part on at least one of the error rates and/or adjusting a schedule for human presence at the field site based at least in part on at least one of the error rates.

As an example, a camera can be an outdoor camera with a lens wiper. As an example, a camera can be an indoor camera. For example, where a shelter exists at a field site, it may be protected from environmental conditions such as rain, sun, etc. In such an example, an indoor camera may be suitable; whereas, for a gauge that is outdoors and exposed to environmental conditions, a more robust camera may be utilized that can include a wiper to clear a lens to assure an ability to capture images of the gauge.

As an example, gauges can include a rack mounted gauge and/or an outdoor flow equipment mounted gauge and/or other equipment mounted gauge.

As an example, a method can include performing image recognition on imagery data for detecting movement of at least one gauge. For example, consider detecting movement of a gauge mounted to flow equipment where flow characteristics of fluid in the flow equipment can be discerned via movements of the flow equipment and hence the gauge. For example, consider gas entrainment as causing vibrations, hammer effects due to flow interruption, etc.

As an example, a method can include performing image recognition on imagery data that includes detecting temperature of at least one piece of equipment at a field site.

As an example, a system can include a processor; memory accessible to the processor; processor-executable instructions stored in the memory and executable by the processor to instruct the system to: receive data for a field site by an edge framework gateway at the field site, where the data correspond to equipment operations at the field site and where the data include imagery data acquired by one or more cameras at the field site; perform image recognition on the imagery data to recognize gauges and to recognize content displayed on the gauges via execution of a machine learning model on the edge framework gateway; and issue an instruction based at least in part on the recognized content displayed on the gauges.

As an example, one or more computer-readable media can include computer-executable instructions executable by a system to instruct the system to: receive data for a field site by an edge framework gateway at the field site, where the data correspond to equipment operations at the field site and where the data include imagery data acquired by one or more cameras at the field site; perform image recognition on the imagery data to recognize gauges and to recognize content displayed on the gauges via execution of a machine learning model on the edge framework gateway; and issue an instruction based at least in part on the recognized content displayed on the gauges.

As an example, a computer program product can include one or more computer-readable storage media that can include processor-executable instructions to instruct a computing system to perform one or more methods and/or one or more portions of a method.

Figure 19:
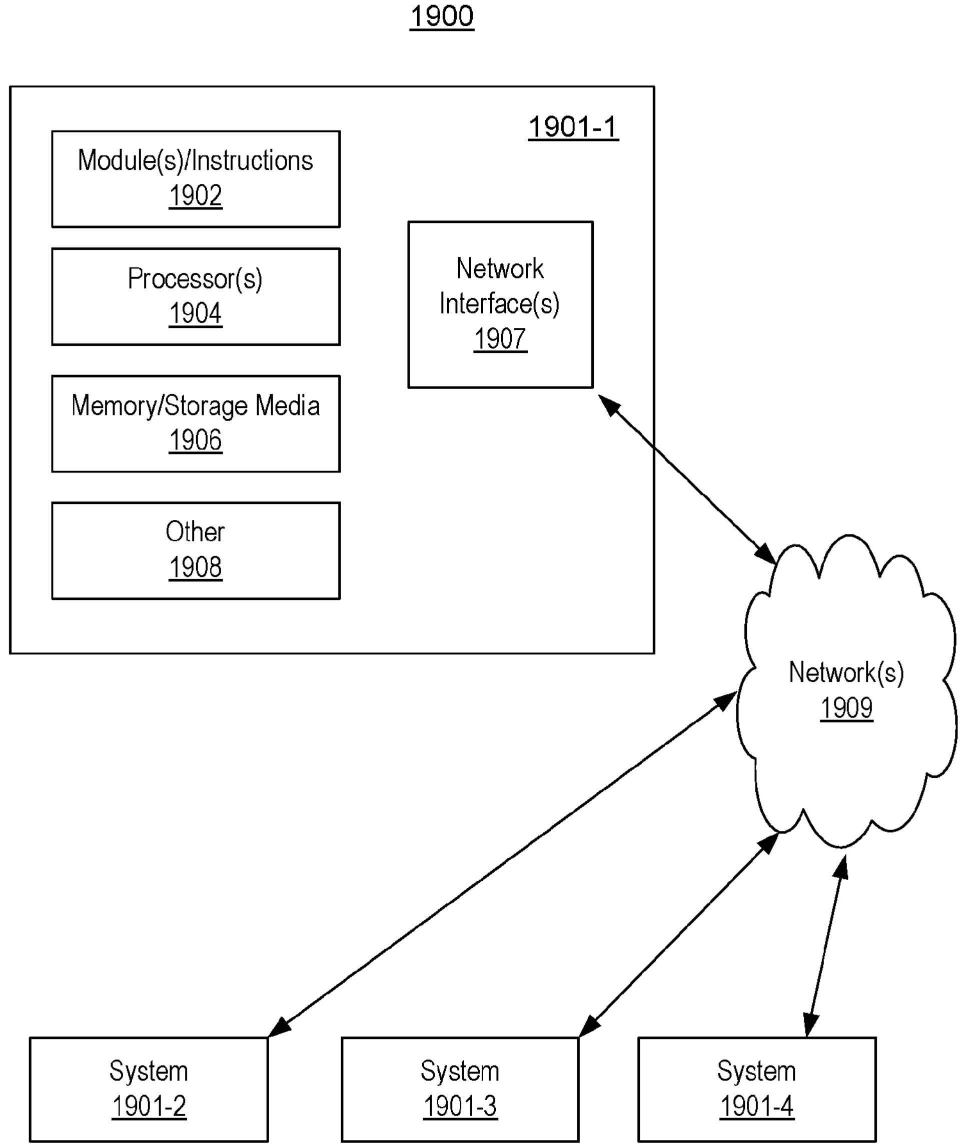
FIG. 19 illustrates examples of computer and network equipment.

In some embodiments, a method or methods may be executed by a computing system. FIG. 19 shows an example of a system 1900 that can include one or more computing systems 1901-1, 1901-2, 1901-3 and 1901-4, which may be operatively coupled via one or more networks 1909, which may include wired and/or wireless networks.

As an example, a system can include an individual computer system or an arrangement of distributed computer systems. In the example of FIG. 19, the computer system 1901-1 can include one or more modules 1902, which may be or include processor-executable instructions, for example, executable to perform various tasks (e.g., receiving information, requesting information, processing information, simulation, outputting information, etc.).

As an example, a module may be executed independently, or in coordination with, one or more processors 1904, which is (or are) operatively coupled to one or more storage media 1906 (e.g., via wire, wirelessly, etc.). As an example, one or more of the one or more processors 1904 can be operatively coupled to at least one of one or more network interface 1907. In such an example, the computer system 1901-1 can transmit and/or receive information, for example, via the one or more networks 1909 (e.g., consider one or more of the Internet, a private network, a cellular network, a satellite network, etc.).

As an example, the computer system 1901-1 may receive from and/or transmit information to one or more other devices, which may be or include, for example, one or more of the computer systems 1901-2, etc. A device may be located in a physical location that differs from that of the computer system 1901-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1906 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 20:
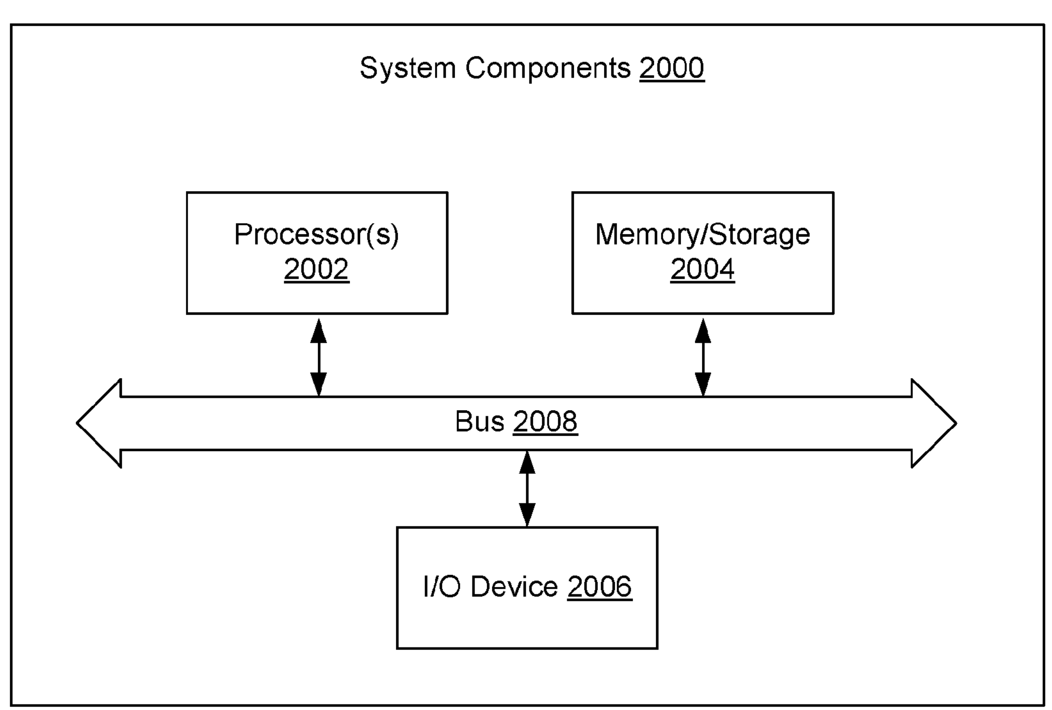
FIG. 20 illustrates example components of a system and a networked system.
Figure 20:
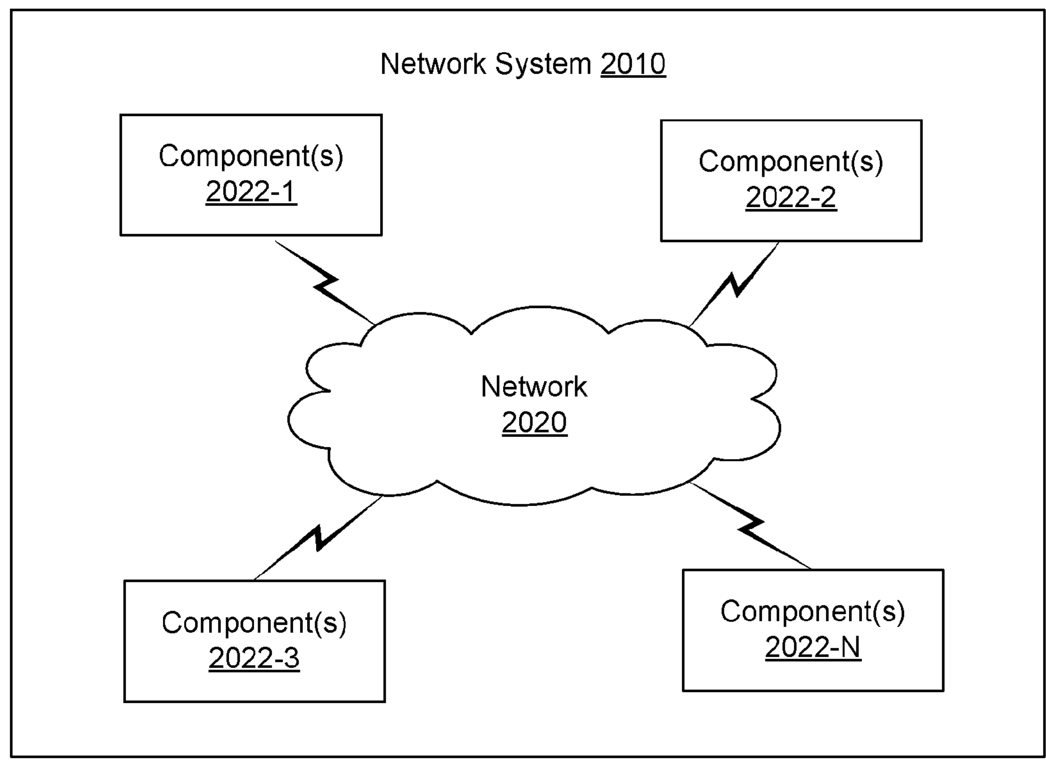

FIG. 20 shows components of an example of a computing system 2000 and an example of a networked system 2010 with a network 2020. The system 2000 includes one or more processors 2002, memory and/or storage components 2004, one or more input and/or output devices 2006 and a bus 2008. In an example embodiment, instructions may be stored in one or more computer-readable media (e.g., memory/storage components 2004). Such instructions may be read by one or more processors (e.g., the processor(s) 2002) via a communication bus (e.g., the bus 2008), which may be wired or wireless. The one or more processors may execute such instructions to implement (wholly or in part) one or more attributes (e.g., as part of a method). A user may view output from and interact with a process via an I/O device (e.g., the device 2006). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2010. The network system 2010 includes components 2022-1, 2022-2, 2022-3, . . . 2022-N. For example, the components 2022-1 may include the processor(s) 2002 while the component(s) 2022-3 may include memory accessible by the processor(s) 2002. Further, the component(s) 2022-2 may include an I/O device for display and optionally interaction with a method. A network 2020 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called “cloud” environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:

receiving data for a wellsite by an edge framework gateway at the wellsite, wherein the data correspond to equipment operations at the wellsite and wherein the data comprise imagery data acquired by one or more cameras at the wellsite;

performing image recognition on the imagery data via execution of a machine learning model on the edge framework gateway, wherein performing the image recognition comprises:

identifying a type of one or more gauges in the imagery data;

accessing instructional information for the type of the one or more gauges, wherein the instructional information comprises a manual associated with the type of the one or more gauges; and recognizing content displayed on the one or more gauges in the imagery data using at least the instructional information; and issuing an instruction based at least in part on the recognized content displayed on the one or more gauges, wherein the instruction comprises a control action to control operation of one or more valves or pumps at the wellsite.

2. The method of claim 1, wherein the type of the one or more gauges comprises an analog gauge or a digital gauge, and a gauge model of the analog gauge or digital gauge.

3. The method of claim 1, comprising training the machine learning model at least in part by assessing the performing, wherein the machine learning model comprises a trained machine learning model.

4. The method of claim 1, comprising contextualizing the recognized content based at least in part on the instructional information.

5. The method of claim 1, wherein the recognized content displayed on the one or more gauges is in an alphanumeric format.

6. The method of claim 5, comprising transmitting at least a portion of the recognized content to a remote site via a satellite.

7. The method of claim 6, comprising rendering the at least a portion of the recognized content to a display with a virtual representation of at least a portion of at least one of the one or more gauges.

8. The method of claim 1, comprising comparing the recognized content to human transcribed content for at least one of the one or more gauges.

9. The method of claim 8, comprising determining an error rate for the recognized content, an error rate for the human transcribed content or error rates for the recognized content and the human transcribed content.

10. The method of claim 9, comprising deciding to increase automation at the wellsite based at least in part on at least one of the error rates.

11. The method of claim 9, comprising adjusting a schedule for human presence at the wellsite based at least in part on at least one of the error rates.

12. The method of claim 1, wherein the one or more cameras comprise an outdoor camera with a lens wiper.

13. The method of claim 1, wherein the one or more cameras comprise an indoor camera.

14. The method of claim 1, wherein the type of the one or more gauges comprises an outdoor flow equipment mounted gauge.

15. The method of claim 1, wherein the performing image recognition on the imagery data comprises detecting a vibrational movement of at least one of the one or more gauges associated with a gauge error comprising gas entrainment or a hammer effect.

16. The method of claim 1, wherein the performing image recognition on the imagery data comprises detecting temperature of at least one piece of equipment at the wellsite.

17. The method of claim 1, wherein the one or more cameras are located on one or more drones, and wherein the one or more drones comprise a mobile gateway configured to generate a model of the wellsite and control operation of the one or more valves or pumps at the wellsite.

18. The method of claim 1, wherein the imagery data comprises a first subset of imagery data used in the identifying the type of the one or more gauges and a second subset of imagery data used in the recognizing content displayed on the one or more gauges, and wherein the first subset of imagery data and the second subset of imagery data are different.

19. A system comprising:

a processor;

memory accessible to the processor; and processor-executable instructions stored in the memory and executable by the processor to instruct the system to:

receive data for a wellsite by an edge framework gateway at the wellsite, wherein the data correspond to equipment operations at the wellsite and wherein the data comprise imagery data acquired by one or more cameras at the wellsite;

perform image recognition on the imagery data via execution of a machine learning model on the edge framework gateway, wherein the processor-executable instructions executable by the processor to perform the image recognition further comprise instructions to:

identify a type of one or more gauges in the imagery data;

access instructional information for the type of the one or more gauges, wherein the instructional information comprises a manual associated with the type of the one or more gauges; and recognize content displayed on the one or more gauges in the imagery data using at least the instructional information; and issue an instruction based at least in part on the recognized content displayed on the one or more gauges, wherein the instruction comprises a control action to control operation of one or more valves or pumps at the wellsite.

20. One or more non-transitory computer-readable media comprising computer-executable instructions executable by a system to instruct the system to:

receive data for a wellsite by an edge framework gateway at the wellsite, wherein the data correspond to equipment operations at the wellsite and wherein the data comprise imagery data acquired by one or more cameras at the wellsite;

perform image recognition on the imagery data via execution of a machine learning model on the edge framework gateway, wherein the computer-executable instructions executable by the system to perform the image recognition further comprise instructions to:

identify a type of one or more gauges in the imagery data, wherein the type of the one or more gauges comprises an analog gauge or a digital gauge and a gauge model of the analog gauge or digital gauge;

access instructional information for the type of the one or more gauges, wherein the instructional information comprises a manual associated with the type of the one or more gauges; and recognize content displayed on the one or more gauges in the imagery data using at least the instructional information; and issue an instruction based at least in part on the recognized content displayed on the one or more gauges, wherein the instruction comprises a control action to control operation of one or more valves or pumps at the wellsite.

* * * * *